United States Patent [19]

Wickstrom et al.

[11] Patent Number: 5,491,513
[45] Date of Patent: Feb. 13, 1996

[54] BIT RATE CONTROLLER FOR ENCODING VIDEO SIGNALS

[75] Inventors: Larry Wickstrom; Michael Keith, both of Beaverton; Adnan Alattar, Hillsboro, all of Oreg.

[73] Assignee: Intel Corporation, Santa Clara, Calif.

[21] Appl. No.: 267,161

[22] Filed: Jun. 28, 1994

Related U.S. Application Data

[63] Continuation of Ser. No. 119,438, Sep. 9, 1993, which is a continuation-in-part of Ser. No. 78,931, Jun. 16, 1993, Pat. No. 5,351,085.

[51] Int. Cl.$^6$ ................................................ H04N 7/13
[52] U.S. Cl. ..................... 348/390; 348/409; 348/415
[58] Field of Search .................................. 348/390, 391, 348/397–410, 415–422, 426; H04N 7/12, 7/13

[56] References Cited

U.S. PATENT DOCUMENTS

| | | |
|---|---|---|
| 4,743,959 | 5/1988 | Frederiksen . |
| 4,827,339 | 5/1989 | Wada et al. ........................... 348/390 |
| 4,857,992 | 8/1989 | Richards . |
| 4,933,761 | 6/1990 | Murakami et al. . |
| 4,953,019 | 8/1990 | Skikakura et al. . |
| 4,974,071 | 11/1990 | Maeda . |
| 4,994,911 | 2/1991 | Nakayama et al. . |
| 5,003,299 | 3/1991 | Batson et al. . |
| 5,046,071 | 9/1991 | Tanoi . |
| 5,047,853 | 9/1991 | Hoffert et al. . |
| 5,068,644 | 11/1991 | Batson et al. . |
| 5,097,330 | 3/1992 | Guichard et al. . |
| 5,122,875 | 6/1992 | Raychaudhuri et al. ................ 348/390 |
| 5,122,877 | 6/1992 | Keesman . |
| 5,124,688 | 6/1992 | Rumball . |
| 5,134,476 | 7/1992 | Aravind et al. ..................... 348/390 X |
| 5,148,272 | 9/1992 | Acampora et al. ..................... 348/467 |
| 5,150,209 | 9/1992 | Baker et al. . |
| 5,177,608 | 1/1993 | Ohki et al. . |
| 5,218,431 | 6/1993 | Gleicher et al. . |
| 5,220,410 | 6/1993 | Wakeland et al. . |
| 5,241,382 | 8/1993 | Paik et al. . |
| 5,311,602 | 5/1994 | Nieglos et al. . |
| 5,317,397 | 5/1994 | Odaka et al. . |
| 5,327,254 | 7/1994 | Daher . |
| 5,341,442 | 8/1994 | Barrett . |
| 5,351,085 | 9/1994 | Coelho et al. . |
| 5,377,051 | 12/1994 | Lane et al. . |
| 5,381,145 | 1/1995 | Allen et al. . |

OTHER PUBLICATIONS

Kronander, "Post-and Pre-Processing in Coding of Image Sequences Using Filters with Motion Compensated History" 1988 Int. Conf. Acoustics, Speech. Sig. Processing, vol. 2, Apr. 1988, pp. 1104–1107.

*Primary Examiner*—Victor R. Kostak
*Attorney, Agent, or Firm*—Steve Mendelsohn; William H. Murray

[57] ABSTRACT

A reference characterization characterizes the relationship between frames encoded using a first encoding process and frames encoded using a second encoding process for a variety of frames. A previous frame is encoded using the first encoding process and the encoded previous frame is characterized. A current frame is encoded using the second encoding process, wherein the current frame is encoded in accordance with the reference characterization and the characterization of the encoded previous frame.

22 Claims, 26 Drawing Sheets

204

VERSION NUMBER 302

FLAGS 304

DATA SIZE 306

CB OFFSET 308
RESERVED 310
CHECKSUM 312

IMAGE HEIGHT 314

IMAGE WIDTH 316

Y DATA OFFSET 318

V DATA OFFSET 320

U DATA OFFSET 322

RESERVED 324

ALT QUANT 326

500

MC VECTOR COUNT 502

MC VECTORS 504

ENCODED DATA 506

FIG. 6

```
WRITE BITSTREAM HEADER
FOR EACH IMAGE PLANE (Y, U, V)
{
    SEGMENT PLANE INTO A ROUGHLY REGULAR GRID OF CELLS, USING BINARY TREE FOR EACH CELL IN PLANE
    {
        COMPUTE H AND V ENERGY OF CELL (** SEE BELOW)
        IF (H ENERGY AND V ENERGY ARE SMALL)     SELECT MODE 10
        ELSE IF (V ENERGY IS SMALL)              SELECT MODE 3
        ELSE                                     SELECT MODE 0

SELECT QUANTIZATION FOR CELL BASED ON ENERGY FOR EACH CELL IN PLANE
        {
            FOR EACH 4x4 BLOCK
            {
                FOR EACH OF THE 8 DYADS IN THE BLOCK
                {
                    READ 2 PIXELS FROM IMAGE, SUBTRACT PREDICTION TO GET (X,Y)
                    FIND VECTOR IN VQ SET WHICH IS CLOSEST TO (X,Y)
                    ADD (X,Y) TO PREDICTION, CHECK OVERFLOW
                    IF (OVERFLOW CONDITION NOT TRUE)
                        FIND VECTOR IN VQ SET CLOSEST TO (X,Y) AND WHICH DOES NOT CAUSE
                        OVERFLOW
                    STORE DYAD INDEX IN A TEMP ARRAY
                }
                FOR EACH OF THE 4 LINES IN THE BLOCK
                {
                    IF THE PAIR OF DYADS ON THIS LINE FORM A QUAD
                        STORE QUAD INDEX IN TEMP ARRAY
                    ELSE
                        STORE 2 DYAD INDICES IN TEMP ARRAY
                }
                LOOP THRU INDICES GENERATED, AND COMBINE ADJACENT 0 QUADS INTO SPECIAL
                CODES (255, 254, 253)
            }
        }
    }
}

** THE H AND V ENERGY OF A CELL ARE COMPUTED AS FOLLOWS:

SUM = 0
FOR EACH PIXEL IN CELL
{
    DIFF = THIS PIXEL - PIXEL TO THE RIGHT
    H += DIFF*DIFF
    DIFF = THIS PIXEL - PIXEL BELOW IT
    V += DIFF*DIFF
}
H = H / SIZE OF CELL
V = V / SIZE OF CELL

AFTER COMPUTING H AND V, THEY ARE COMPARED WITH ADJUSTABLE THRESHOLDS TO DECIDE WHICH
    ENCODING MODE TO USE FOR A CELL.
```

FIG. 7A

```
FOR EACH IMAGE PLANE (Y, U, V)
{
    FIND START OF PLANE DATA USING DATAOFFSET FIELD IN HEADER
    CALCULATE PLANE SIZE FROM XSIZE, YSIZE IN HEADER AND PLANE NUMBER:
            IF (PLANE -- Y)
                    SIZE - SIZE FROM HEADER
            ELSE
                    SIZE - (((SIZE FROM HEADER + 3) >> 2) + 3) & ~ 3

INITIALIZE CELL TO WHOLE IMAGE
    WHILE (BINARY TREE NOT EXHAUSTED)
    {
            GET NEXT BINARY TREE 2-BIT CODE
            IF (IN PRIMARY TREE)
            {
                    IF (CODE -- V_SPLIT)
                            SPLIT CELL IN HALF WITH VERTICAL LINE, PUSH BOTH SUBCELLS ON STACK
                    ELSE IF (CODE -- H_SPLIT)
                            SPLIT CELL IN HALF WITH HORIZONTAL LINE, PUSH BOTH SUBCELLS ON STACK
                    ELSE IF (CODE -- REL_FILL)
                            GET MOTION VECTOR INDEX FROM BITSTREAM
                            ENTER SECONDARY TREE
                    ELSE IF (CODE -- ABS_FILL)
                            MARK THIS REGION AS INTRA, ENTER SECONDARY TREE
            }
            ELSE (MUST BE IN SECONDARY TREE)
            {
                    IF (CODE -- V_SPLIT)
                            SPLIT CELL IN HALF WITH VERTICAL LINE, PUSH BOTH SUBCELLS ON STACK
                    ELSE IF (CODE -- H_SPLIT)
                            SPLIT CELL IN HALF WITH HORIZONTAL LINE, PUSH BOTH SUBCELLS ON STACK
                    ELSE IF (CODE -- VQ_DATA)
                            POP CELL FROM STACK
                            READ VQ DESCRIPTOR BYTE
                            CALL PROCESSCELL
                    ELSE IF (CODE -- VQ_NULL)
                            POP CELL FROM STACK
                            READ 2-BIT NULL CODE (EITHER COPY OR SKIP)
                            CALL COPYCELL OR SKIPCELL
            }
    }
}
```

FIG. 7B

COPYCELL ROUTINE:

FOR EACH PIXEL IN THE CELL
    COPY PIXEL FROM THE MOTION-COMPENSATED PREVIOUS CELL (IF INTER FRAME) OR FROM PREVIOUS LINE OF
    THIS FRAME (IF INTRA FRAME)

SKIPCELL ROUTINE:

MARK ALL BLOCKS IN CELL AS "SKIPPED"
RETURN

NOTE: THE PURPOSE OF MARKING BLOCKS AS SKIPPED IS SO THAT COLOR CONVERSION AND COPY TO DISPLAY
CAN BE AVOIDED FOR THESE BLOCKS, THUS PROVIDING INCREASED EFFICIENCY.

FIG. 7C

PROCESSCELL ROUTINE

PROCESSCELL IS ACTUALLY A COLLECTION OF ROUTINES, EACH OF WHICH HANDLES ONE OR MORE "MODES" WITH WHICH CELLS CAN BE ENCODED.

THE ROUTINES AVAILABLE ARE:

| | |
|---|---|
| MODE012 | (PROCESSES MODE 0, 1, OR 2) |
| MODE34 | (PROCESSES MODE 3 OR 4) |
| MODE56 | (PROCESSES MODE 5 OR 6) |
| MODE789 | (PROCESSES MODE 7, 8, OR 9) |
| MODE10 | (PROCESSES MODE 10) |
| MODE1112 | (PROCESSES MODE 11 OR 12) |

---

MODE 012

IN THIS MODE THE 8 DYADS IN EACH 4X4 BLOCK ARE ENCODED, IN THE ORDER
```
    1   0
    3   2
    5   4
    7   6
```
AND THERE ARE ADDITIONAL CODES THAT CAN REPRESENT MORE THAN ONE DYAD IN A SINGLE CODE.

THE ONLY DIFFERENCE BETWEEN MODES 0, 1, 2 ARE THE APPLICATION OF THE TWO VQ TABLES SPECIFIED FOR THIS CELL. (THESE ARE SPECIFIED IN THE VQ TABLE DESCRIPTOR READ AT THE BEGINNING OF THE CELL.) MODE 0 USES PPPP, MODE 1 USES SPSP, AND MODE 2 USES SPSS, FOR THE 4 LINES OF EACH BLOCK.

FOR EACH 4X4 BLOCK IN THE CELL (IN RASTER ORDER)
{
    GET NEXT BYTE FROM BITSTREAM
    IF (BYTE REPRESENTS A DYAD)
        GET PREDICTION PIXEL PAIR, EITHER FROM PREVIOUS LINE OF THIS IMAGE (IF INTRA CODED), OR FROM
        CORRESPONDING LINE OF MOTION-COMPENSATED CELL IN PREVIOUS IMAGE
        ADD DYAD CORRECTION TO PREDICTION
        WRITE NEW PIXELS TO THIS IMAGE
        REPEAT THE ABOVE FOR 2ND DYAD ON THIS LINE

ELSE IF (BYTE REPRESENTS A QUAD)
        GET 4 PIXELS FROM PREDICTIOIN, ADD 4-BYTE QUAD CORRECTOR, WRITE RESULT

ELSE IF (BYTE == 248)
        READ ANOTHER BYTE, EXTRACT LOWER 7 BITS
        IF (MSB OF BYTE == 0)
            WRITE THE 7-BIT VALUE TO ALL 16 PIXELS IN THIS BLOCK
        ELSE
            WRITE IT TO ALL OF THIS BLOCK AND ALL OF THE NEXT BLOCK

ELSE IF (BYTE == 250)
        SKIP THIS BLOCK (MARK IT AS SKIPPED, DO NOTHING MORE)

ELSE IF (BYTE == 249)
        SKIP THIS BLOCK AND THE NEXT ONE

FIG. 7D

MODE012 (CONT)

ELSE IF (BYTE == 255)
        APPLY 0 CORRECTOR TO ALL LINES OF THIS BLOCK UP TO THE 2ND LINE

ELSE IF (BYTE == 254)
        APPLY 0 CORRECTOR TO ALL LINES OF THIS BLOCK UP TO THE 3RD LINE

ELSE IF (BYTE == 253)
        APPLY 0 CORRECTOR TO ALL REMAINING LINES OF THE BLOCK

ELSE IF (BYTE == 252)
        APPLY BYTE 253 PROCESS, THEN APPLY 0 CORRECTOR TO WHOLE NEXT BOCK

ELSE IF (BYTE == 251)
        APPLY BYTE 253 PROCESS, THEN APPLY 0 CORRECTOR TO NEXT 2 BLOCKS
}

MODE 34

MODES 3 AND 4 DIFFER ONLY IN THE APPLICATION OF THE VQ TABLES. MODE 3 USES P ONLY, WHEREAS MODE 4 SWITCHES BETWEEN P AND S ON ALTERNATE LINES.

THE MODE34 PROCESS IS:

DIVIDE Y SIZE OF CELL BY 2
PERFORM MODE012 PROCESS USING BITSTREAM DATA
DOUBLE THE Y SIZE OF THE RESULTING PIXEL ARRAY, BY INSERTING (A+B)>>1 BETWEEN EACH VERTICAL PAIR OF PIXELS.

(NOTE: IF THE CELL IS AT THE TOP OF THE IMAGE, DON'T AVERAGE THE TOP LINE, JUST REPLICATE.)

FIG. 7E

MODE 56

MODES 5 AND 6 DIFFER ONLY IN THE APPLICATION OF THE VQ TABLES. MODE 5 USES P ONLY, WHEREAS MODE 6 SWITCHES BETWEEN P AND S ON ALTERNATE LINES.

THE MODE56 PROCESS IS:

```
FOR EACH 4X4 BLOCK IN THE CELL (IN RASTER ORDER)
{
        FOR EACH OF THE 2ND AND 4TH LINES OF THE BLOCK
        {
        GET NEXT BYTE FROM BITSTREAM
        IF (BYTE REPRESENTS A DYAD)
                GET PREDICTION PIXEL PAIR, EITHER FROM PREVIOUS LINE OF THIS IMAGE (IF INTRA CODED), OR FROM
                CORRESPONDING LINE OF MOTION-COMPENSATED CELL IN PREVIOUS IMAGE
                ADD DYAD CORRECTION TO PREDICTION
                WRITE NEW PIXELS TO THIS IMAGE
                REPEAT THE ABOVE FOR 2ND DYAD ON THIS LINE
                PREVIOUS LINE = AVERAGE OF THIS LINE AND (THIS-2)TH LINE
                READ A BIT FROM BITSTREAM
                IF (BIT == 1)
                        ADD ANOTHER CORRECTOR (2 DYADS OR 1 QUAD) TO PREVIOUS LINE

ELSE IF (BYTE REPRESENTS A QUAD)
                GET 4 PIXELS FROM PREDICTION, ADD 4-BYTE QUAD CORRECTOR, WRITE RESULT
                PREVIOUS LINE = AVERAGE OF THIS LINE AND (THIS-2)TH LINE
                READ A BIT FROM BITSTREAM
                IF (BIT == 1)
                        ADD ANOTHER CORRECTOR (2 DYADS OR 1 QUAD) TO PREVIOUS LINE

ELSE IF (BYTE == 248)
                READ ANOTHER BYTE, EXTRACT LOWER 7 BITS
                IF (MSB OF BYTE == 0)
                        WRITE THE 7-BIT VALUE TO ALL 16 PIXELS IN THIS BLOCK
                ELSE
                        WRITE IT TO ALL OF THIS BLOCK AND ALL OF THE NEXT BLOCK

ELSE IF (BYTE == 250)
                SKIP THIS BLOCK (MARK IT AS SKIPPED, DO NOTHING MORE)

ELSE IF (BYTE == 249)
                SKIP THIS BLOCK AND THE NEXT ONE

ELSE IF (BYTE == 253)
                APPLY 0 CORRECTOR TO ALL REMAINING LINES OF THE BLOCK

ELSE IF (BYTE == 252
                APPLY BYTE 253 PROCESS, THEN APPLY 0 CORRECTOR TO WHOLE NEXT BLOCK

ELSE IF (BYTE == 251)
                APPLY BYTE 253 PROCESS, THEN APPLY 0 CORRECTOR TO NEXT 2 BLOCK
        }
}
```

FIG. 7F

<u>MODE 789</u>

THE ONLY DIFFERENCE BETWEEN MODES 7, 8, 9 ARE THE APPLICATION OF THE TWO VQ TABLES SPECIFIED FOR THIS CELL. (THESE ARE SPECIFIED IN THE VQ TABLE DESCRIPTOR READ AT THE BEGINNING OF THE CELL.) MODE 7 USES PPPP, MODE 8 USES SPSP, AND MODE 9 USES SPSS, FOR THE 4 LINES OF EACH BLOCK.

THE PROCESSING FOR THESE MODES IS AS FOLLOWS:

```
FOR EACH 4X4 BLOCK IN THE CELL
{
    FOR EACH 4X1 LINES IN THE CELL
    {
        READ 2 BITS FROM BITSTREAM

IF (BITS == 00)
            APPLY 0 QUAD TO THIS LINE

ELSE IF (BITS == 01)
            READ DYAD INDEX FROM BITSTREAM, APPLY TO FIRST DYAD ON LINE
            APPLY 0 DYAD TO 2ND DYAD ON LINE

ELSE IF (BITS == 10)
            READ CODE FROM BITSTREAM
            IF (CODE IS A DYAD)
                APPLY 0 DYAD TO FIRST DYAD ON LINE,
                APPLY THIS DYAD TO 2ND DYAD ON LINE
            ELSE IF A QUAD
                APPLY QUAD TO THIS LINE

ELSE IF (BITS == 11)
            READ 2 DYADS FROM BITSTREAM, APPLY TO THIS LINE
    }
}
```

FIG. 7G

MODE 10

MODE 10 PROCESSING IS AS FOLLOWS:

FOR EACH 4X4 BLOCK IN THE CELL
{
    GET BYTE FROM BITSTREAM
    IF BYTE REPRESENTS A QUAD
        GET 4-BYTE CORRECTOR (ABCD) FROM VQ TABLE
    ELSE
        GET ANOTHER BYTE FROM BITSTREAM
        CONCATENATE TWO DYADS TO FORM A 4-BYTE CORRECTOR (ABCD)

IF (INTRA)
        APPLY THIS PATTERN OF CORRECTORS:
                O O O O
                B B A A
                O O O O
                D D C C
        ELSE (IF INTER) APPLY:
                B B A A
                B B A A
                D D C C
                D D C C
}

MODES 11, 12

MODES 11 AND 12 DIFFER ONLY IN THE APPLICATION OF THE VQ TABLES. MODE 11 USES P ONLY, WHEREAS MODE 11 SWITCHES BETWEEN P AND S ON ALTERNATE LINES.

THESE MODES CAN ONLY BE USED IN AN INTER-CODED CELL.

PROCESSING FOR MODE 11/12 IS AS FOLLOWS:

DIVIDE Y SIZE OF CELL BY 2
PERFORM MODE012 PROCESS USING BITSTREAM DATA, BUT JUST STORE CORRECTOR ARRAY RATHER THAN ADDING TO PREDICTION
DOUBLE THE Y SIZE OF THE CORRECTOR ARRAY BY REPEATING EACH VALUE VERTICALLY
ADD DOUBLED CORRECTOR ARRAY TO PREDICTED CELL, WRITE RESULT TO IMAGE

FIG. 17

TYPE Q1: NO MATCH

| L1 | L2 |
|----|----|
| L3 | L4 |

TYPE Q2: VERTICAL MATCH

| L1 | L2 |
|----|----|
| L1 | L3 |

| L2 | L1 |
|----|----|
| L3 | L1 |

| L1 | L2 |
|----|----|
| L1 | L2 |

TYPE Q3: HORIZONTAL MATCH

| L1 | L1 |
|----|----|
| L2 | L3 |

| L2 | L3 |
|----|----|
| L1 | L1 |

| L1 | L1 |
|----|----|
| L2 | L2 |

TYPE Q4: DIAGONAL MATCH

| L1 | L2 |
|----|----|
| L3 | L1 |

| L2 | L1 |
|----|----|
| L1 | L3 |

| L1 | L2 |
|----|----|
| L2 | L1 |

TYPE Q5: THREE MATCH

| L2 | L1 |
|----|----|
| L1 | L1 |

| L1 | L2 |
|----|----|
| L1 | L1 |

| L1 | L1 |
|----|----|
| L1 | L2 |

| L1 | L1 |
|----|----|
| L2 | L1 |

TYPE Q6: FOUR MATCH

| L1 | L1 |
|----|----|
| L1 | L1 |

908

BIT RATE CONTROLLER FOR ENCODING VIDEO SIGNALS

CROSS-REFERENCES TO RELATED APPLICATIONS

This is a continuation of application serial number 08/119, 438, filed on Sep. 9, 1993, which is a continuation-in-part of copending application Ser. No. 08/078,931, filed on Jun. 16, 1993 and issued as U.S. Pat. No. 5,351,085 on Sep. 27, 1994.

BACKGROUND OF THE INVENTION

1. Field of the Invention

The present invention relates to image signal processing, and, in particular, to systems for reducing the amount of digital data required to represent a digital image signal to facilitate uses, for example, such as the transmission, recording, and reproduction of the digital image signal.

2. Description of the Related Art

Conventional systems for playing video in a PC environment are limited, in part, by the processing capabilities of the PC processors. These limitations include low video frame rates and small video window sizes for display of video images. Such limitations result in low video quality. As a result, some conventional systems for playing video in a PC environment require additional hardware that is designed to process video data at the rates needed to provide acceptable video quality.

It is, therefore, desirable to provide a playback video system for displaying high-quality, full-motion digital video images on a graphics display monitor in a personal computer (PC) environment that does not require any additional hardware. Such a playback video system is preferably capable of performing decoding and display functions to support playback mode. In playback mode, the playback video system accesses encoded video data from a mass storage device, decodes the data, and displays the decoded data on a display monitor.

It is also desirable to provide a compression video system for generating the encoded video data that will be decoded and displayed by the playback video system. Such a compression video system is preferably capable of performing capture, encoding, decoding, and display functions to support both a compression mode and the playback mode. In compression mode, the compression video system captures and encodes video images generated by a video generator, such as a video camera, VCR, or laser disc player. The encoded video data may then be stored to a mass storage device, such as a hard drive or, ultimately, a CD-ROM. At the same time, the encoded video data may also be decoded and displayed on a display monitor to monitor the compression-mode processing.

It is accordingly an object of this invention to overcome the disadvantages and drawbacks of the known art and to provide a playback video system for displaying high-quality, full-motion video images in a PC environment.

It is a further object of this invention to provide a compression video system for generating the encoded video data to be decoded and displayed by the playback video system.

It is a particular object of the present invention to provide a playback video system for displaying video images under a multi-media operating system running on a personal computer with a general-purpose processor.

Further objects and advantages of this invention will become apparent from the detailed description of a preferred embodiment which follows.

SUMMARY OF THE INVENTION

The present invention is a computer-implemented process and apparatus for encoding image signals. According to a preferred embodiment, a reference characterization of encoded frames encoded using a first encoding process relative to encoded frames encoded using a second encoding process for a variety of frames is provided. A previous frame is encoded using the first encoding process and the encoded previous frame is characterized. A current frame is encoded using the second encoding process, wherein the current frame is encoded in accordance with the reference characterization and the characterization of the encoded previous frame.

BRIEF DESCRIPTION OF THE DRAWINGS

Other objects, features, and advantages of the present invention will become more fully apparent from the following detailed description of a preferred embodiment, the appended claims, and the accompanying drawings in which:

FIG. 6 presents the pseudo-code for a preferred embodiment of the real-time encoder of the video system of FIG. 1;

FIGS. 7a–7g present the pseudo-code for a preferred embodiment of the decoder of the video system of FIG. 1;

FIG. 17 shows the six different types of quadrant quantizing that may exist in a cell;

DESCRIPTION OF PREFERRED EMBODIMENT(S)

Description of Video System

Figure 1:
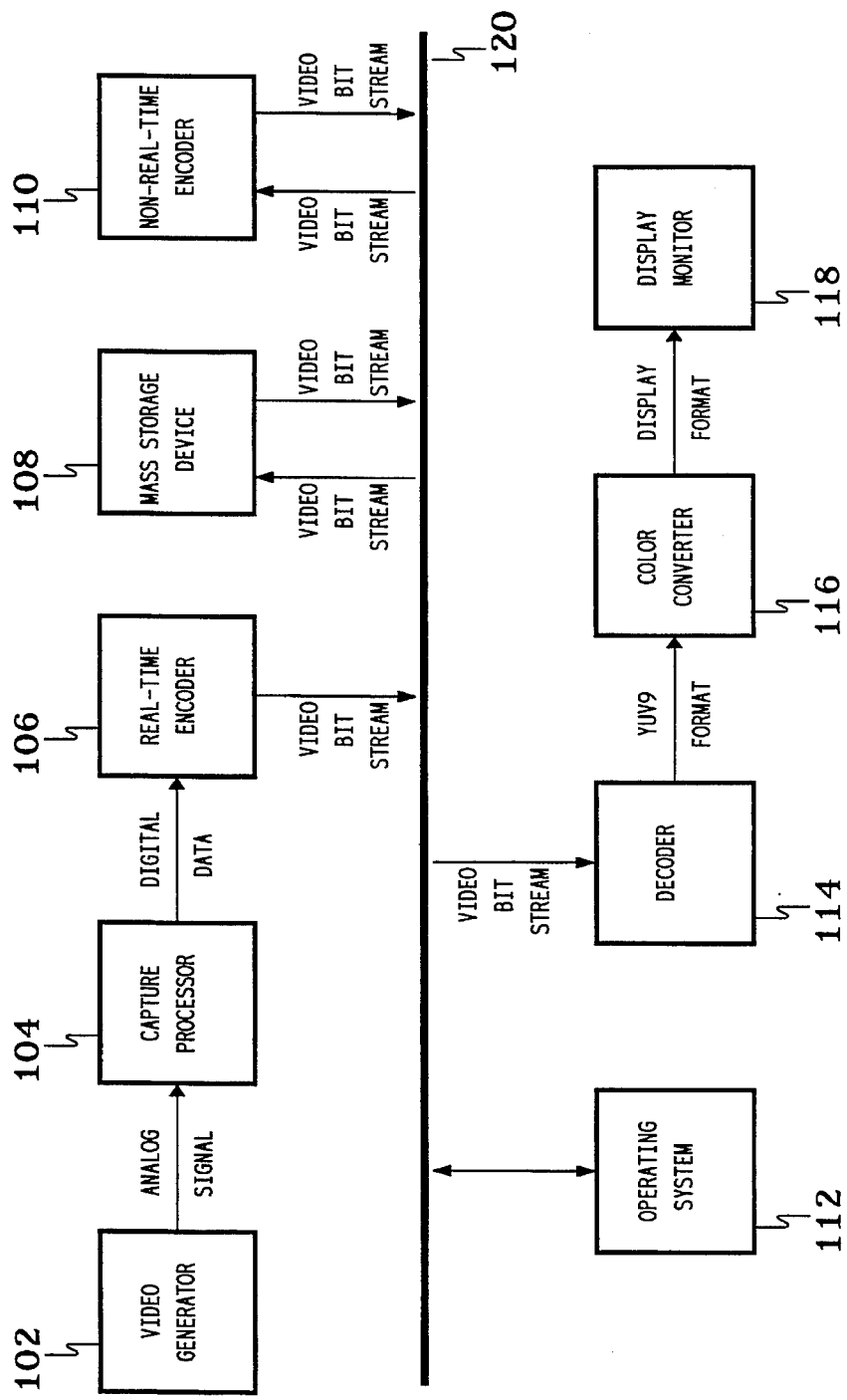
FIG. 1 is a block diagram of a video system for displaying video images in a PC environment, according to a preferred embodiment of the present invention.

Referring now to FIG. 1, there is shown a block diagram of a video system 100 for displaying video images in a PC environment, according to a preferred embodiment of the present invention. Video system 100 is capable of performing in the compression and playback modes. The operations of video system 100 are controlled by operating system 112 which communicates with the other processing engines of video system 100 via system bus 120.

When video system 100 operates in compression mode, video generator 102 of video system 100 generates analog video signals and transmits those signals to capture processor 104. Capture processor 104 decodes (i.e., separates) the analog video signal into three linear components (one luminance component Y and two chrominance components U and V), digitizes each component, and scales the digitized data. Scaling of the digitized data preferably includes sub-sampling the U and V data to generate digitized video data in subsampled YUV9 format. Those skilled in the art will understand that YUV9 data has one U-component value and one V-component value for every (4×4) block of Y-component values.

Real-time encoder 106 encodes (i.e., compresses) each component of the captured (i.e., unencoded or uncompressed) YUV9 data separately and transmits the encoded data as a video bitstream via system bus 120 for storage to mass storage device 108. The syntax of the video bitstream is described in further detail later in this specification in conjunction with FIGS. 2–5.

The encoded data may then be optionally further encoded by non-real-time (NRT) encoder 110. If such further encoding is selected, then NRT encoder 110 accesses the encoded video-bitstream data stored in mass storage device 108, encodes the data further, and transmits the further encoded video data back to mass storage device 108. The output of NRT encoder 110 is further encoded video data that follows the same video-bitstream syntax as the encoded video data generated by real-time encoder 106.

Video system 100 also provides optional monitoring of the compression-mode processing. If such monitoring is selected, then, in addition to being stored to mass storage device 108, the encoded video bitstream (generated by either real-time encoder 106 or non-real-time encoder 110) is decoded (i.e., decompressed) back to YUV9 format (and scaled for display) by decoder 114. Color converter 116 then converts the decoded, scaled YUV9 data to a display format selected for displaying the video images on display monitor 118. The display format is preferably selected to be either CLUT8 or RGB24 format, depending on the requirements of display monitor 118, although alternative embodiments of the present invention may support additional or alternative display formats.

When video system 100 operates in the playback mode, decoder 114 accesses video data in the encoded video-bitstream format stored in mass storage device 108 and decodes and scales the encoded data back to decoded YUV9 format. Color converter 116 then converts the decoded, scaled YUV9 data to a selected display format for display on display monitor 118.

Those skilled in the art will understand that, depending on the modes to be supported, some of the components of video system 100 as depicted in FIG. 1 may be considered optional. For example, in compression mode, decoder 114, color converter 116, and display monitor 118 are optional, if compression-mode monitoring is not selected. Similarly, in playback mode, video generator 102, capture processor 104, real-time encoder 106, and non-real-time encoder 110 are optional.

In a preferred embodiment, operating system 112 is a multi-media operating system, such as, but not limited to, Microsoft® Video for Windows or Apple® QuickTime, running on a personal computer with a general-purpose processor, such as, but not limited to, an Intel® ×86 or Motorola® microprocessor. An Intel® ×86 microprocessor may be an Intel® 386, 486, or Pentium™ processor. Video generator 102 may be any source of analog video signals, such as a video camera, VCR, or laser disc player. Capture processor 104 and real-time encoder 106 are preferably implemented by a video processor such as an Intel® i750 encoding engine on an Intel® Smart Video Board. Non-real-time encoder 110 is preferably implemented in software running on the general-purpose processor.

Mass storage device 108 may be any suitable device for storing digital data, such as a hard drive or a CD-ROM. Those skilled in the art will understand that video system 100 may have more than one mass storage device 108. For example, video system 100 may have a hard drive for receiving encoded video-bitstream data generated during compression mode and a CD-ROM for storing other encoded video-bitstream data for playback mode.

Decoder 114 and color converter 116 are preferably implemented in software running on the general-purpose processor. Display monitor 118 may be any suitable device for displaying video images and is preferably a graphics monitor such as a VGA monitor.

Those skilled in the art will understand that each of the functional processors of video system 100 depicted in FIG. 1 may be implemented by any other suitable hardware/software processing engine.

Overview of Video Encoding Process

Video system 100 encodes each component plane of YUV9 video data separately. Each component plane is segmented into regions using binary-tree image segmentation. Each region is encoded based on adaptive two-phase vector quantization with either intraframe prediction or interframe (i.e., delta) prediction. Each region may also be encoded using motion estimation (preferably at whole-pixel increments). Each region of a component plane may be encoded using different vector-quantization tables and/or different motion-estimation vectors from other regions of that component plane. A region is encoded in units of (4×4) blocks in raster order, with the Y-, U-, and V-component data preferably encoded as 7-bit values.

Every pixel in a region is predicted. If the region is an "intra" region, then pixels are encoded based on the difference D between vertically adjacent pixels in the same frame, such that:

$$D = pixel(n,x,y) - pixel(n,x,y-1)$$

where n is the frame number, x is the column number, and y is the row number. If the region is an "inter" or delta region, then pixels are encoded based on the difference D between corresponding pixels in successive frames taking into account any motion estimation, such that:

$$D = pixel(n,x,y) - pixel(n-1,x+dx,y+dy),$$

where (dx,dy) are the components of the motion estimation vector.

Each region may be encoded using up to two different vector-quantization (VQ) tables: a primary VQ table and a secondary VQ table. A region may be encoded in any one of thirteen different encoding modes, as presented in Table I.

cally to the first and second rows, and a different corrector from the secondary VQ table is applied twice vertically to the third and fourth rows.

Pixels in each (4×4) block are encoded in (×1) dyads in the following order:

10
32
54
76

There are 256 different byte codes for encoding the dyads. These 256 byte codes fall into the following six categories:

(1) apply dyad N;

(2) apply two dyads (i.e., a quad);

(3) apply 4, 6, or 8 consecutive zero-valued dyads;

(4) apply zero-valued dyads to n blocks;

(5) skip n blocks; and (6) apply absolute value to whole block (i.e., "monotone").

The following is the assembler language inner loop for modes 0, 1, or 2 of Table I:

TABLE I

Video Encoding Algorithm Modes

| Row | 0 | 1 | 2 | 3 | 4 | 5 | 6 | 7 | 8 | 9 | 10A | 10B | 11 | 12 |
|---|---|---|---|---|---|---|---|---|---|---|---|---|---|---|
| 1 | P | S | S | X | X | Z | Z | π | σ | σ | 0 | PP | P | P |
| 2 | P | P | P | P | P | P | P | π | π | π | PP | PP | P | P |
| 3 | P | S | S | X | X | Z | Z | π | σ | σ | 0 | QQ | Q | S |
| 4 | P | P | S | P | S | P | S | π | π | σ | QQ | PP | Q | S |

The modes of Table I describe how each row of each (4×4) block of a region is encoded. The letter "P" denotes that the primary VQ table is used for the corresponding row. The letter "S" denotes that the secondary VQ table is used. The letter "X" denotes that no corrections are applied and that the pixel values are generated by interpolation. The letter "Z" denotes that interpolation is performed, and, if the next two-bit code has a value of "1", then an "S" correction is performed. The letter "π" denotes that a "P" correction is applied with 2-bit codes to indicate if one or two dyads or a quad is to be used. The letter "σ" denotes that an "S" correction is applied with two-bit codes to indicate if one or two dyads or a quad is to be used. For example, in mode 1, the first and third rows of each (4×4) block of the region are encoded using the secondary VQ table, while the second and fourth rows are encoded using the primary VQ table.

Mode 10A applies to "intra" cells and mode 10B applies to "inter" cells. In mode 10A, the zero corrector is applied to the first and third rows, a corrector from the primary VQ table is applied twice horizontally to the second row, and a different corrector from the primary VQ table is applied twice horizontally to the fourth row. In mode 10B, a corrector from the primary VQ table is applied twice horizontally and twice vertically to the first and second rows, and a different corrector from the primary VQ table is applied twice horizontally and twice vertically to the third and fourth rows. In mode 11, a corrector from the primary VQ table is applied twice vertically to the first and second rows, and a different corrector from the primary VQ table is applied twice vertically to the third and fourth rows. In mode 12, a corrector from the primary VQ table is applied twice verti-

```
mov dl,gs:[ebp + K]         ; get next data byte
mov eax,es:[edx*4 + C]      ; get VQ delta
add eax,[esi + M*PITCH]     ; add to prediction
jns quadN                   ; speedup common case
mov dl,jmpidx[edx]          ; select action for
jmp jmptableN[edx]          ; arbitrary case
quadN:
mov [edi + D*PITCH],eax     ; store 4 pixels
{repeat the above in unrolled loop}
```

The results of encoding each block of each region of each component plane of each frame of video data are organized according the video bitstream syntax, which is described in the next section.

Referring now to FIG. 6, there is presented the pseudo-code for a preferred embodiment of real-time encoder 106 of video system 100 of FIG. 1. The pseudo-code is preferably implemented in assembly language on a general-purpose microprocessor or special-purpose video processor. In order to meet the constraints of real-time encoding, real-time encoder 106 preferably does not use all the features of the bitstream syntax of video system 100. Those skilled in the art will understand that non-real-time encoder 114 preferably uses more features of the bitstream syntax to produce more highly compressed bitstreams, for example, by using motion estimation to determine the optimum predicted cell for inter cells. Real-time encoder 106 preferably uses only intra cells. The "overflow condition" referred to in the pseudo-code of FIG. 6 tests whether both resulting 7-bit pixel values are strictly between the values 8 and 120, when adding a dyad corrector to a prediction.

Referring now to FIGS. 7a–7g, there is presented the pseudo-code for a preferred embodiment of decoder 114 of video system 100 of FIG. 1. The pseudo-code is preferably implemented in assembly language on a general-purpose processor or any processor capable of real-time decoding. All pixels in all three component planes (i.e, Y, V, and U) are preferably 7-bit values with Y constrained to be within 8 and 120.

Description of Video Bitstream Syntax

Figure 2:
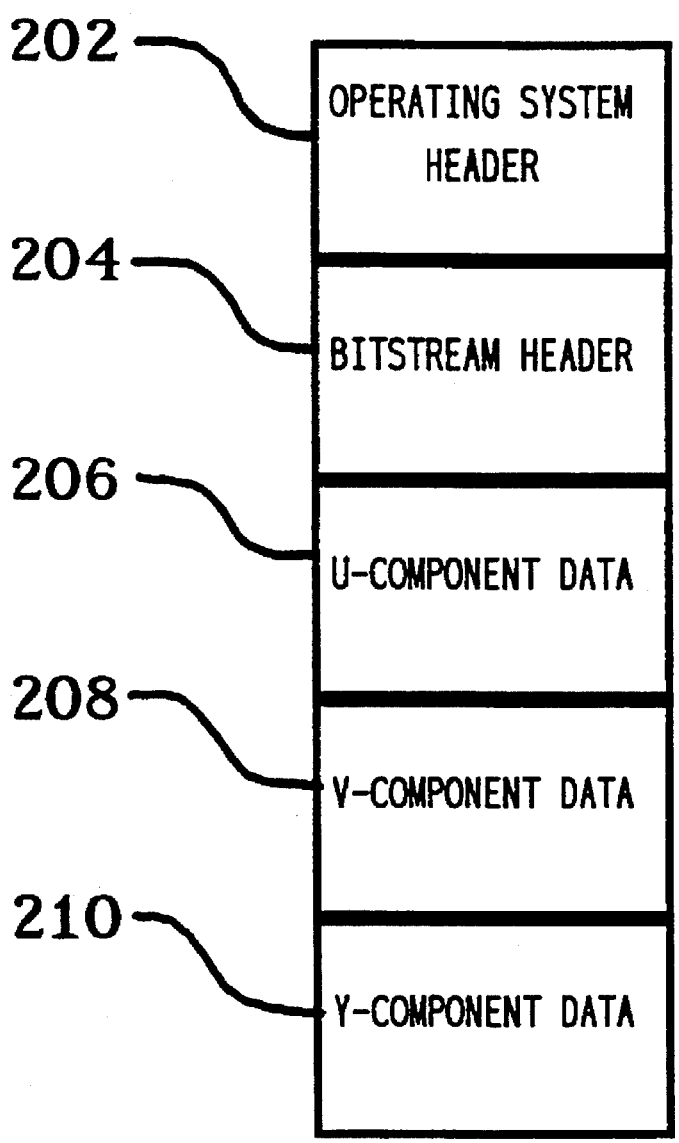
FIG. 2 depicts the syntax of the encoded video bitstream of the video system of FIG. 1.

Referring now to FIG. 2, there is shown a representation of a preferred syntax of the encoded video bitstream 200 corresponding to one frame of video data. Video bitstream 200 is generated by real-time encoder 106 and non-real-time encoder 110, and is decoded by decoder 114 of video system 100 of FIG. 1. Each frame of video data in video bitstream 200 includes OPERATING SYSTEM header 202, VIDEO BITSTREAM header 204, U-COMPONENT DATA field 206, V-COMPONENT DATA field 208, and Y-COMPONENT DATA field 210.

Multi-media operating systems typically support several types of encoding/decoding processes. OPERATING SYSTEM header 202 of the video bitstream 200 informs operating system 112 of video system 100 that the video bitstream 200 is to be decoded using the decoding process implemented by decoder 114 of video system 100 of FIG. 1. In general, OPERATING SYSTEM header 202 contains information required by the particular multi-media operating system of video system 100.

Figure 3:
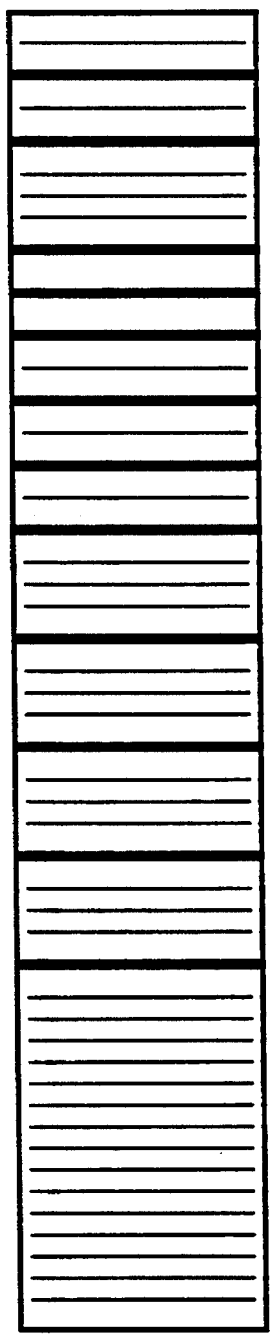
FIG. 3 depicts the syntax of the video bitstream header of the video bitstream of FIG. 2.

Referring now to FIG. 3, there is shown a representation of a preferred syntax of VIDEO BITSTREAM header 204 of video bitstream 200 of FIG. 2. VIDEO BITSTREAM header 204 is a forty-eight-byte field.

VERSION NUMBER 302 of VIDEO BITSTREAM header 204 is a two-byte integer field that identifies the decoding process version number used to create the current data frame. VERSION NUMBER 302 preferably has a decimal value of 32.

Figure 4:
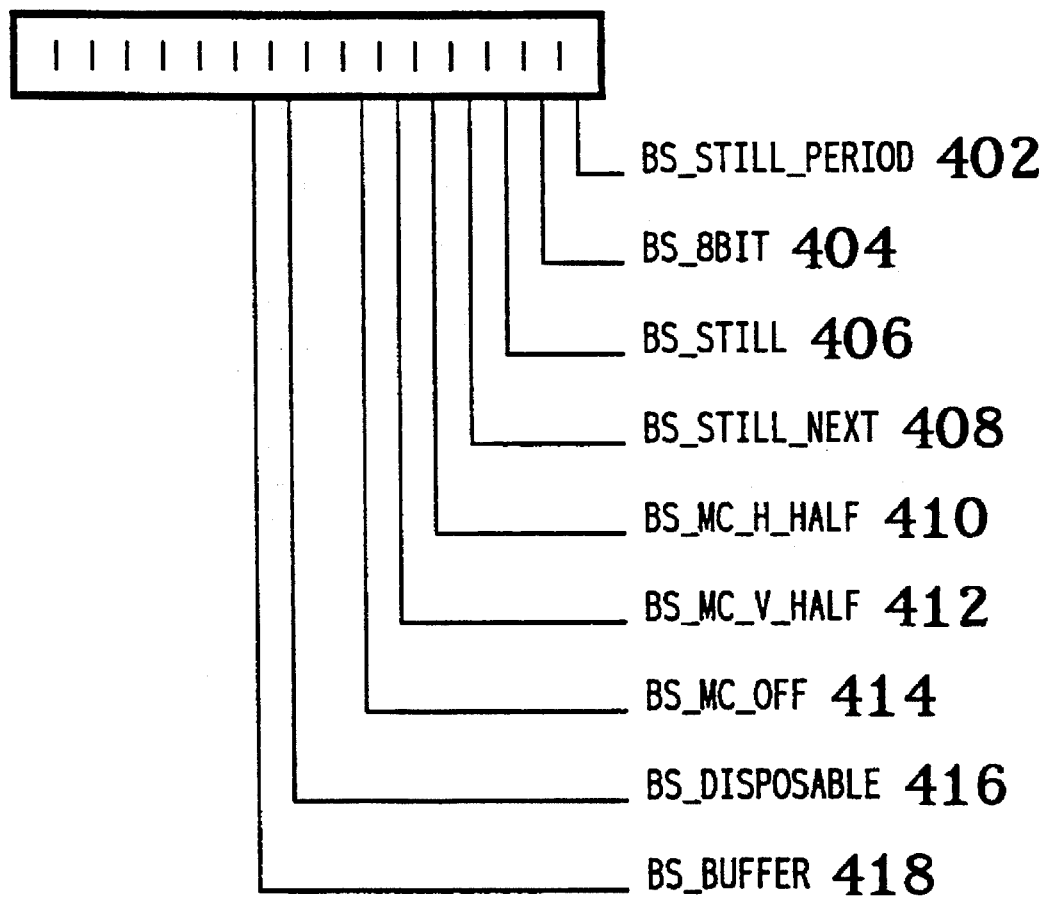
FIG. 4 depicts the syntax of the flags field of the video bitstream header of FIG. 3.

Referring now to FIG. 4, there is shown a representation of a preferred syntax of FLAGS 304 of VIDEO BITSTREAM header 204 of FIG. 3. FLAGS 304 is a two-byte unsigned field.

BS_STILL_PERIOD 402 is bit 0 (the least significant bit (LSB)) of FLAGS 304. BS_STILL_PERIOD 402 denotes whether the current frame is a periodic still frame (i.e., a periodic key frame). If BS_STILL_PERIOD 402 is 1, then the current frame is a periodic still frame.

BS_8BIT 404 is bit 1 of FLAGS 304 and denotes whether the YUV-component data uses 8 bits or 7 bits. If BS_8BIT 404 is 0, then the YUV-component data uses only 7 bits. In a preferred embodiment, the YUV-component data uses only 7 bits.

BS_STILL 406 is bit 2 of FLAGS 304 and denotes whether the current frame is a still frame (i.e., any type of key frame). If BS_STILL 406 is 1, then the current frame is a still frame.

BS_STILL_NEXT 408 is bit 3 of FLAGS 304 and denotes whether the next frame is a still frame. If BS_STILL_NEXT 408 is 1, then the next frame is a still frame.

BS_MC_H_HALF 410 is bit 4 of FLAGS 304 and denotes whether the horizontal components of the motion compensation vectors for the current frame are in whole-pixel or half-pixel increments. In a preferred embodiment, the motion compensation vectors are in whole-pixel increments. A value of 0 for BS_MC_H_HALF 410 indicates whole-pixel increments.

BS_MC_V_HALF 412 is bit 5 of FLAGS 304 and denotes whether the vertical components of the motion compensation vectors for the current frame are in whole-pixel or half-pixel increments. In a preferred embodiment, the motion compensation vectors are in whole-pixel increments. A value of 0 for BS_MC_V_HALF 410 indicates whole-pixel increments.

BS_MC_OFF 414 is bit 6 of FLAGS 304 and denotes whether only the null motion compensation vector is used throughout the current frame. A value of 1 for BS_MC_OFF 414 indicates that only the null motion compensation vector is used.

Bit 7 of FLAGS 304 is reserved.

BS_DISPOSABLE 416 is bit 8 of FLAGS 304 and denotes whether the current frame is disposable. A value of 1 for BS_DISPOSABLE 416 indicates that the current frame is disposable.

BS_BUFFER 418 is bit 9 of FLAGS 304 and denotes to which of two possible buffers to store the data for the current frame. It also therefore denotes which buffer contains the data for the previous frame (i.e., the other buffer), when the current frame is a delta frame. A value of 0 for BS_BUFFER 418 indicates that the current frame is to be stored to buffer 0; a value of 1 indicates buffer 1.

The unassigned bits of FLAGS 304 (i.e., bits 7 and 10–15) are reserved for future use and are set to zero.

Referring again to FIG. 3, DATA SIZE 306 of VIDEO BITSTREAM header 204 is a four-byte integer field that indicates the total number of bits in the encoded image. This value preferably includes the bitstream header information.

CB OFFSET 308 is a one-byte integer field that indicates a byte offset to apply to the addressed vector quantization (VQ) tables. Video system 100 preferably provides a vector set containing more than 16 different vector quantization tables that may be used during encoding. In a preferred embodiment, VQ tables 0 through 15 are designated to real-time encoder 106 and VQ tables 16 through 31 are designated to non-real-time encoder 110. In that preferred embodiment, when real-time encoder 106 generates a video bitstream, CB OFFSET 308 is set to a value of 0. When non-real-time encoder 110 generates a video bitstream, CB OFFSET 308 is set to a value of 16. For decoding of a particular video bitstream, decoder 114 adds CB OFFSET 308 to the VQ table pointers contained in ALT QUANT 326 to address the appropriate VQ tables.

RESERVED 310 is a one-byte reserved field.

CHECKSUM 312 is a two-byte unsigned field that provides a checksum value for the Y, U, and V planes. The value of CHECKSUM 312 is preferably generated by the encoder to be equal to the "exclusive OR" or "XOR" over all pairs of pixels in the three component planes of the decoded image. CHECKSUM 312 is preferably used only during debugging of video system 100.

IMAGE HEIGHT 314 is a two-byte integer field that indicates the number of pixels in each column of the Y-component plane.

IMAGE WIDTH 316 is a two-byte integer field that indicates the number of pixels in each row of the Y-component plane.

Y DATA OFFSET 318 is a four-byte integer field that indicates the offset in number of bytes from the start of the bitstream header to the beginning of the Y-COMPONENT DATA field 210.

V DATA OFFSET 320 is a four-byte integer field that indicates the offset in number of bytes from the start of the bitstream header to the beginning of the V-COMPONENT DATA field U DATA OFFSET 322 is a four-byte integer field that indicates the offset in number of bytes from the start of the bitstream header to the beginning of the U-COMPONENT DATA field 206.

RESERVED 324 is a four-byte reserved field.

ALT QUANT 326 is a sixteen-byte integer field, each byte of which indicates a pair of VQ tables that may be used in decoding the current frame. The high-order bits of each byte denote the "primary" VQ table, while the low-order bits denote the "secondary" VQ table.

Figure 5:
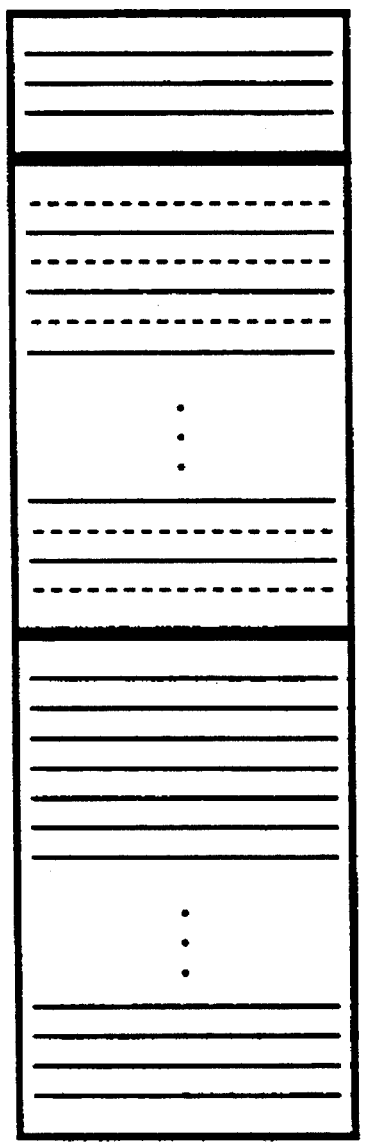
FIG. 5 depicts the syntax of each of the Y-, U-, and V-component data fields of the video bitstream header of FIG. 3.

Referring now to FIG. 5, there is shown a representation of DATA field 500, where DATA field 500 is a preferred syntax of each of U-, V-, and Y-COMPONENT DATA fields 206, 208, and 210 of video bitstream 200 of FIG. 2.

MC VECTOR COUNT 502 of DATA field 500 is four-byte integer field that denotes the number of different motion compensation (MC) vectors that were used to encode (and therefore that are to be used to decode) the current component data plane.

MC VECTORS 504 is a variable-length field that contains the motion compensation vectors used to encode (and to be used to decode) the current component data plane. There are as many entries in MC VECTORS 504 as the value of MC VECTOR COUNT 502. Each entry in MC VECTORS 504 is a two-byte signed MC vector field. The first byte read in the bitstream corresponds to the vertical component and the second byte read in the bitstream corresponds to the horizontal component of a motion compensation vector. When the motion compensation vectors are in whole-pixel increments, component values are the signed byte values. When the motion compensation vectors are in half-pixel increments, component values are the signed byte values divided by two. If the value of MC VECTOR COUNT 502 is zero, then there are no entries in MC VECTORS 504. MC VECTORS 504 may contain up to 256 two-byte MC vector fields.

ENCODED DATA 506 contains unsigned byte data that encodes the current component data plane. ENCODED DATA 506 comprises two-bit binary tree codes and eight-bit region codes. The binary tree codes indicate the segmentation of the current component data plane into regions for encoding. The region codes tell decoder 114 how to decode the encoded pixel data for the current region of a component data plane. ENCODED DATA 506, like MC VECTORS 504, is a variable-length field.

The two-bit binary tree codes are packed four to a byte. These binary-tree-code bytes are then interleaved with the eight-bit region codes. There are three different types of binary tree codes: MC-PHASE tree codes, VQ-PHASE tree codes, and NULL tree codes.

Decoding of an encoded bitstream involves two different phases: a motion-compensation phase and a vector-quantization phase. MC-PHASE tree codes apply during the motion-compensation phase and VQ-PHASE and NULL tree codes apply during the vector-quantization phase. The sequence of tree codes depends on the segmentation and encoding of the component plane.

A value of 0 for an MC-PHASE tree code implies a horizontal split, which means that the current region of the component data field is segmented horizontally into top and bottom halves.

A value of 1 for an MC-PHASE tree code implies a vertical split, which means that the current region of the component data field is segmented vertically into left and right halves.

A value of 2 for an MC-PHASE tree code means that the current region of the component data field is encoded like a key frame.

A value of 3 for an MC-PHASE tree code means that the current region of the component data field is encoded like a delta frame. In this case, motion compensation is performed relative to the previous frame. Such motion compensation is known as "inter-frame" compensation. In this case, the next byte in ENCODED DATA 506 of DATA field 500 of FIG. 1 contains the index for the appropriate motion compensation vector as tabulated in MC VECTORS 504 of DATA field 500 of FIG. 1.

After receiving an MC-PHASE tree code with a value of either 2 or 3, the vector-quantization phase of decoding is entered and the next two-bit binary tree code will be a VQ-PHASE tree code. A value of 0 for a VQ-PHASE tree code implies a horizontal split, which means that the current region of the component data field is segmented horizontally into top and bottom halves.

A value of 1 for a VQ-PHASE tree code implies a vertical split, which means that the current region of the component data field is segmented vertically into left and right halves.

A value of 3 for a VQ-PHASE tree code indicates that the next byte in ENCODED DATA 506 of DATA field 500 of FIG. 1 defines the corrector mode (the upper four bits) and the vector quantization table (the lower four bits) used to decode the current region of the component data field.

A value of 2 for a VQ-PHASE tree code indicates that the next two-bit binary tree code is a NULL tree code.

A value of 0 for a NULL tree code indicates that the corresponding region from the previous frame is to be copied into the current region of the current frame.

A value of 1 for a NULL tree code indicates that the data in the current region is to be left as it is (i.e., that the current region is a null region).

The values of 2 and 3 for a NULL tree code are reserved.

Interleaved with the binary-tree-code bytes in ENCODED DATA 506 for a region of the current component data plane are the region codes for that region. The region codes consist of a variable number of one-byte codes that describe how the pixels for the current region were encoded (and therefore how they are to be decoded).

The first byte of the set of region codes for a particular region contains, among other information, the region mode (i.e., the mode of Table I used to encode the current region). The rest of the bytes in the set of region codes are the byte codes (i.e., the encoded pixels for the current region).

Those skilled in the art will understand that encoded video data, encoded using the syntax of video bitstream 200, may be further encoded and transmitted as "further encoded" video data that is also encoded in the syntax of video bitstream 200. Non-real-time encoder 110 of video system 1)performs such further encoding on encoded video data generated by real-time encoder 106.

Non-Real-Time Encoder Processing

As described earlier in this specification in conjunction with FIG. 1, non-real-time (NRT) encoder 11may be used to generate compressed video data that is encoded in the syntax of video bitstream 200.

Figure 8:
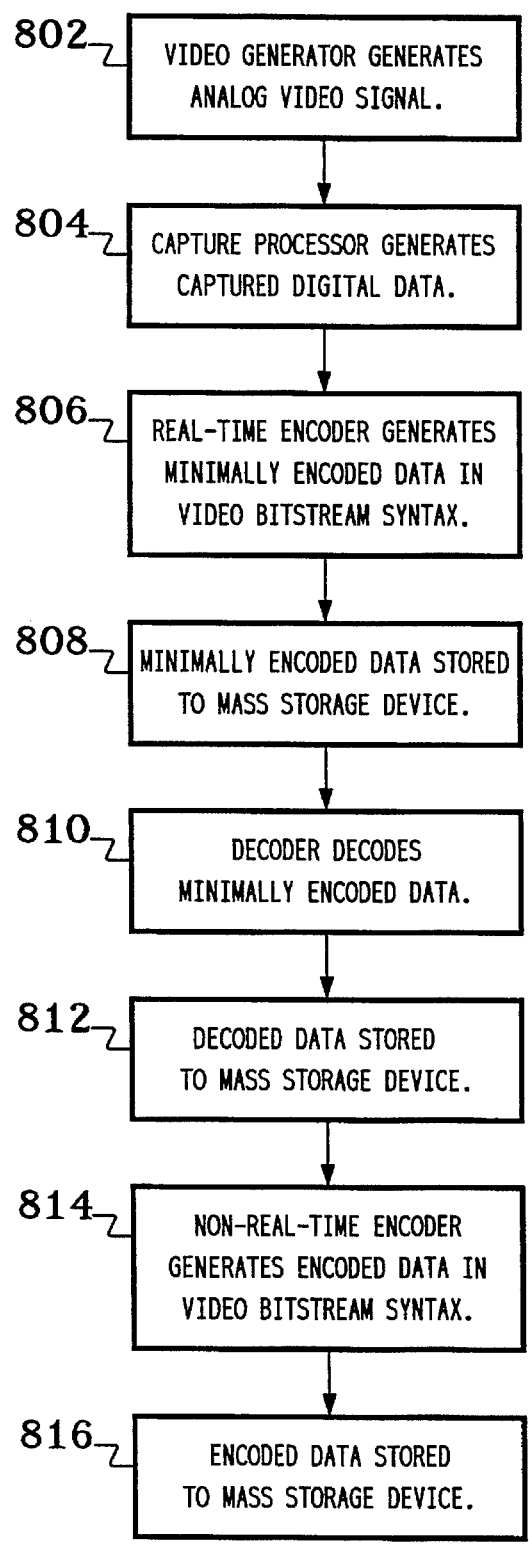
FIG. 8 is a process flow diagram of the processing implemented by the video system of FIG. 1 to encode video data using the non-real-time encoder.

Referring now to FIG. 8, there is shown a process flow diagram of the processing implemented by video system 100 to encode video data using NRT encoder 110, according to a preferred embodiment of the present invention. Video generator 102 of video system 100 of FIG. 1 generates an analog video signal (block 802 of FIG. 8) and capture processor 104 captures the analog video signal as captured digital YUV9 data (block 804). Real-time encoder 106 minimally encodes the YUV9 data in the syntax of video bitstream 2(block 86) and stores the minimally encoded bitstream data to mass storage device 108 (block 808). Those skilled in the art will understand that, since, in this mode of operation of video system 100, NRT encoder 110 is to encode the video data, real-time encoder 106 only minimally encodes the video data to preserve as much of the original video data as possible for NRT encoder 100.

Decoder 114 then decodes the minimally encoded data (block 810) and stores the resulting decompressed YUV9 data back to mass storage device 108 (block 812). NRT encoder 110 encodes the decompressed YUV9 data in the syntax of video bitstream 200 (block 814) and stores the encoded bitstream data back to mass storage device 108 (block 816). The operations of decoder 114 and NRT encoder 11may be performed off line (i.e., not in real time).

As depicted in FIG. 8, NRT encoder 110 encodes decompressed YUV9 video data (i.e., video data that has previously been encoded and decoded). Those skilled in the art will understand that, in other modes of operation, NRT encoder 110 may be used to encode uncompressed YUV9 video data (i.e., raw video data that has never been encoded). It will also be understood that alternative embodiments of non-real-time encoders within the scope of the present invention may be used to encode video data in formats other than YUV9.

Figure 9:
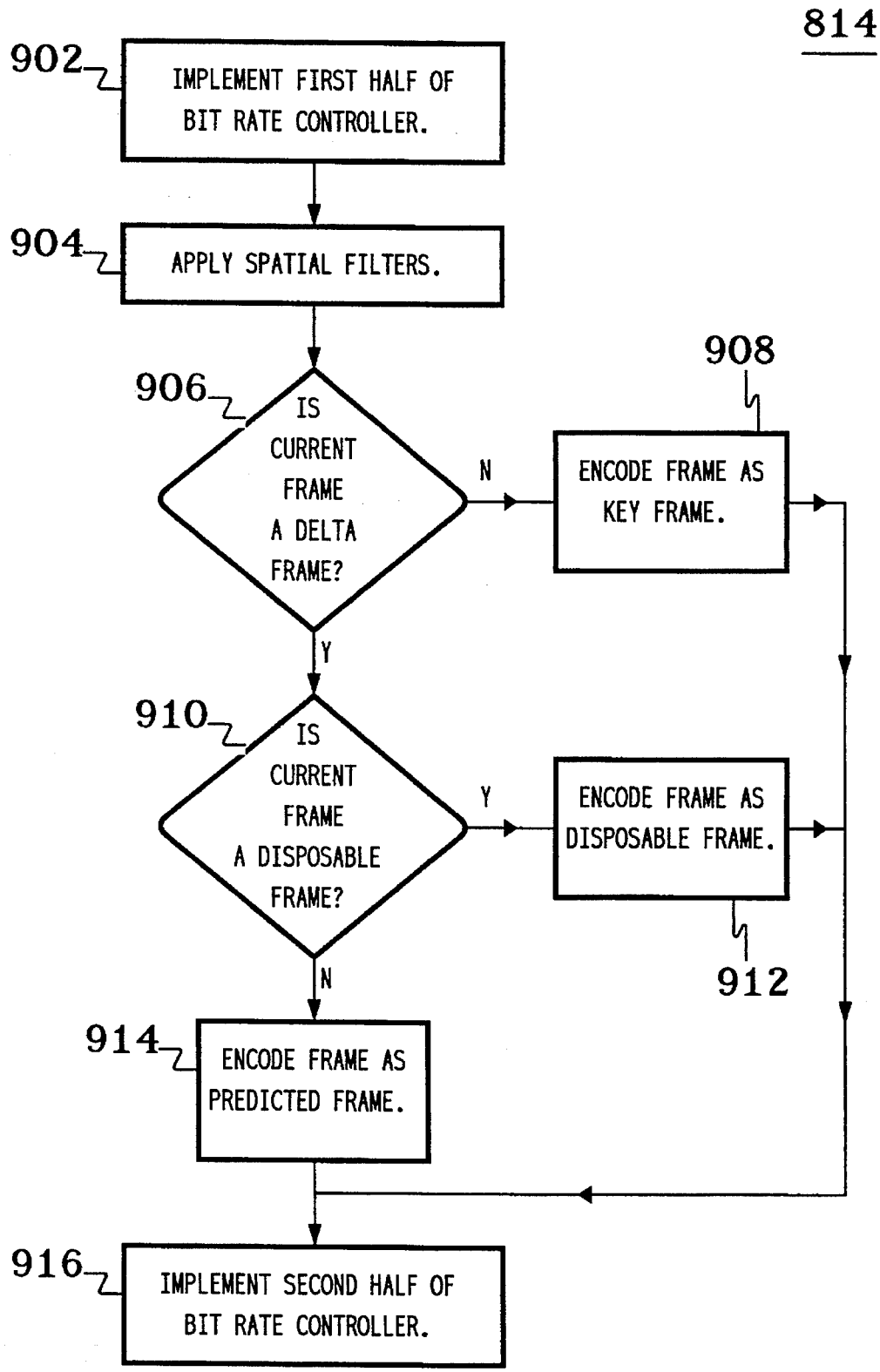
FIG. 9 is a process flow diagram of the processing implemented by the non-real-time encoder of the video system of FIG. 1 to encode each frame of YUV9 video data.

Referring now to FIG. 9, there is shown a process flow diagram of the processing implemented by NRT encoder 110 to encode each frame of YUV9 video data (i.e., block 814 of FIG. 8). In a preferred embodiment of video system 100, there are two types of frames: key frames and delta frames. A delta frame is typically encoded with respect to a previous frame, while a key frame is encoded without respect to any previous frame.

In addition, there are two types of delta frames: predicted frames and disposable frames. A predicted frame is a delta frame that may be used as the reference frame for at least one subsequent delta frame, while a disposable frame is a delta frame that is not used as a reference for any other delta frames.

If a frame is a key frame, then each component plane of the frame is preferably encoded using intra-frame encoding (e.g., based on differences between adjacent pixels within the current frame). If a frame is a delta frame (i.e., either a predicted or disposable frame), then zero, one, or more regions of each component plane may be encoded using intra-frame encoding, while the other regions of the component plane are encoded using inter-frame encoding (e.g., based on differences between pixels of the current frame and pixels of a previous reference frame). It is possible for a component plane of a delta frame to be encoded using only inter-frame encoding or only intra-frame encoding.

NRT encoder 110 begins encoding a frame by implementing the first part of a bit rate controller (block 902 of FIG. 9). The purpose of the bit rate controller is to regulate compressed data rates. The bit rate controller regulates compressed data rates by adjusting the values of certain parameters that control the amount of compression performed by NRT encoder 110 to attempt to achieve a specified target compressed frame size for the current frame being encoded. In video system 100, the target compressed frame size depends on the type of frame being encoded (i.e., key frame, disposable frame, predicted frame). The bit rate controller is described in greater detail later in this specification in conjunction with FIGS. 10 and 11.

After implementing the first part of the bit rate controller, NRT encoder 110 applies a spatial filter to each frame of video data to increase the correlation between neighboring pixels of the frame (block 904). Increased correlation leads to reduced bit rates without appreciable degradation in perceptual quality of the video. In fact, if the original picture has noise, a moderate degree of filtering may improve the perceptual quality by filtering away most of the noise.

In a preferred embodiment, the spatial filter implemented by NRT encoder 110 is a modification of an edge preserving filter. An ordinary filter like a linear filter tends to blur edges within the image. An edge preserving filter is a filter in which neighboring pixels that have values widely different from the pixel being filtered are not included in the filtering. While preventing edges from being blurred, such a filter may lead to contouring when using coding schemes like vector quantization. To avoid contouring in video system 100, rather than ignore the contribution from widely different neighbors, NRT encoder 110 merely reduces their contribution.

A preferred spatial filter for NRT encoder 110 is a separable, five-tap filter applied both in the horizontal and vertical directions. Nominally, the weights of the five-tap filters are: w2, w1, 1, w1, and w2, where 1 is the weight for the central pixel. For a neighbor to contribute, it must satisfy the following criteria:

$$(1-e)*c \leq n \leq (1+e)*c, \tag{1}$$

where c is the value of the pixel being filtered (i.e., the center pixel of the filter), n is the value of the neighbor, and e is the edge thresholding parameter. If either of the two nearest neighbors do not satisfy the above constraint, then a weight w_alt (i.e., smaller than w1) is used as the weight for that neighbor. The preferred ranges of the weights and edge thresholding parameters are as follows:

$0.20 \leq w1 \leq 0.33$ $0.07 \leq w2 \leq 0.10$ $0.07 \leq w\_alt \leq 0.15$ $0.05 < e < 0.27$ In a preferred embodiment, key frames are specified on a periodic basis. For example, NRT encoder 110 may implement the following sequence for encoding frames:

| FRAME: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | K | D | P | D | P | D | P | D | K | D | P | D | P | D | P | D... | where K stands for key frame, D for disposable frame, and P for predicted frame. In this sequence, every eighth frame is a key frame, every even frame that is not a key frame is a predicted frame, and every other frame is a disposable frame. Those skilled in the art will understand that frame 0 is encoded without respect to any previous frames, that frames 1 and 2 are both encoded with respect to frame 0, and that frames 3 and 4 are both encoded with respect to frame 2.

In such a preferred embodiment, the determination of whether to encode the current frame as a key frame or a delta frame may involve a straightforward test of the frame number. If the current frame is to be encoded as a key frame (i.e., not as a delta frame) (block 906 of FIG. 9), then the current frame is encoded as a key frame (block 908). The processing implemented by NRT encoder 110 for key frame encoding is described in greater detail later in this specification in conjunction with FIG. 19.

Otherwise, if the current frame is a delta frame, then the determination (block 910) is made as to whether to encode the current delta frame as a disposable frame (block 912) or as a predicted frame (block 914). The encoding of disposable frames and predicted frames is the same except for the specification of the BS_DISPOSABLE bit 416 in the FLAGS field 304 of bitstream header 204 of video bitstream 200 as described earlier in this specification in conjunction with FIGS. 2–4. When a disposable frame is processed, NRT encoder 110 leaves the reference frame unchanged. When a predicted frame (or a key frame) is processed, NRT encoder 110 updates the reference frame based upon the current frame. The processing implemented by NRT encoder 110 for delta frame encoding is described in greater detail later in this specification in conjunction with FIGS. 12 and 13.

Those skilled in the art will understand that there are alternative and/or additional criteria for determining whether to encode a frame as a key frame or a delta frame. For example, the operating system (e.g., Microsoft® Video for Windows) may request that particular frames be encoded as key frames or delta frames. As another example, the encoder may determine to encode a particular frame as a key frame by characterizing the amount of change that occurs between the designated reference frame and the current frame and then determining whether that amount of change warrants encoding the current frame as a key frame. The characterization may be based upon some relative measure of the differences between the frames.

After the current frame is encoded, NRT encoder 110 implements the second half of the bit rate controller (block 916). The bit rate controller is described in greater detail later in this specification in conjunction with FIGS. 10 and 11.

Bit Rate Controller

Figure 10:
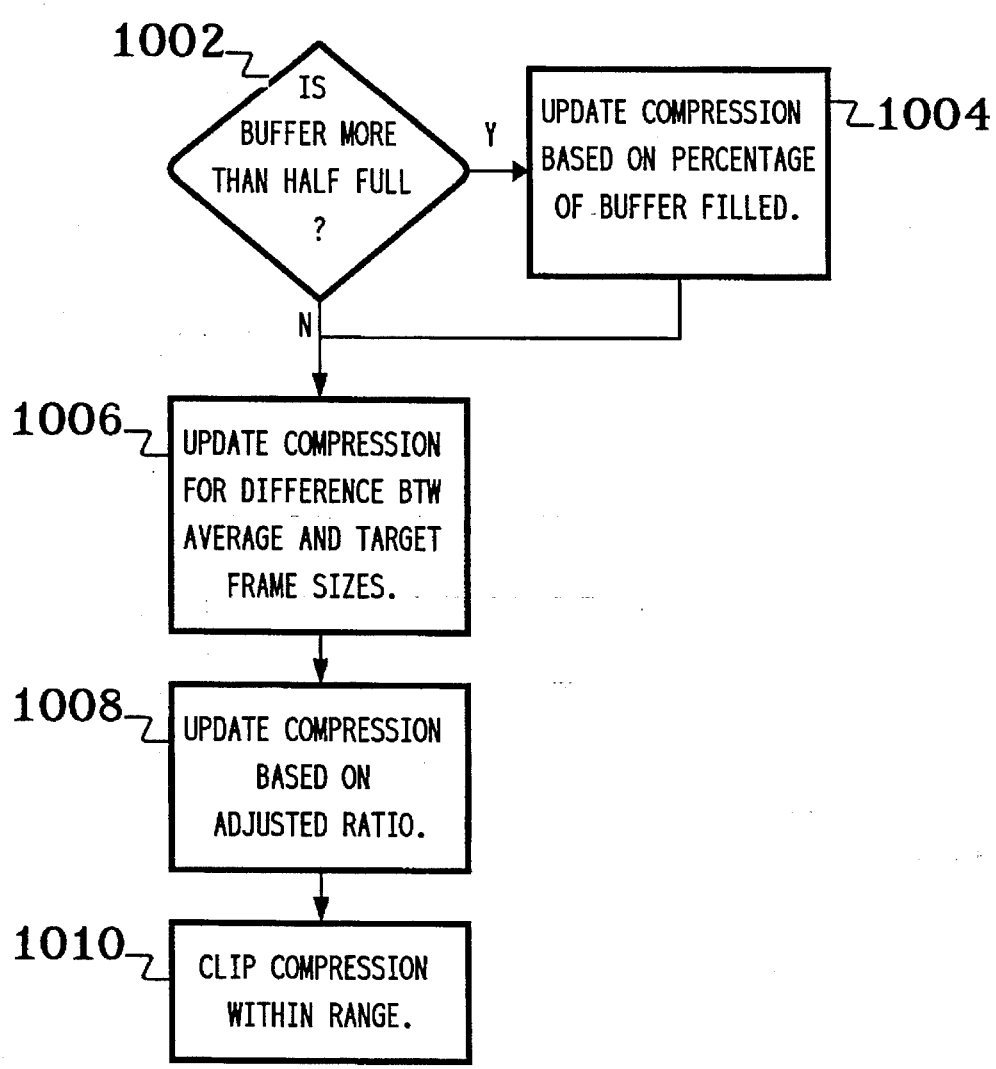
FIGS. 10 and 11 are the first and second parts, respectively, of the bit rate controller implemented by the non-real-time encoder of the video system of FIG. 1 to control compressed frame bit rates.
Figure 11:
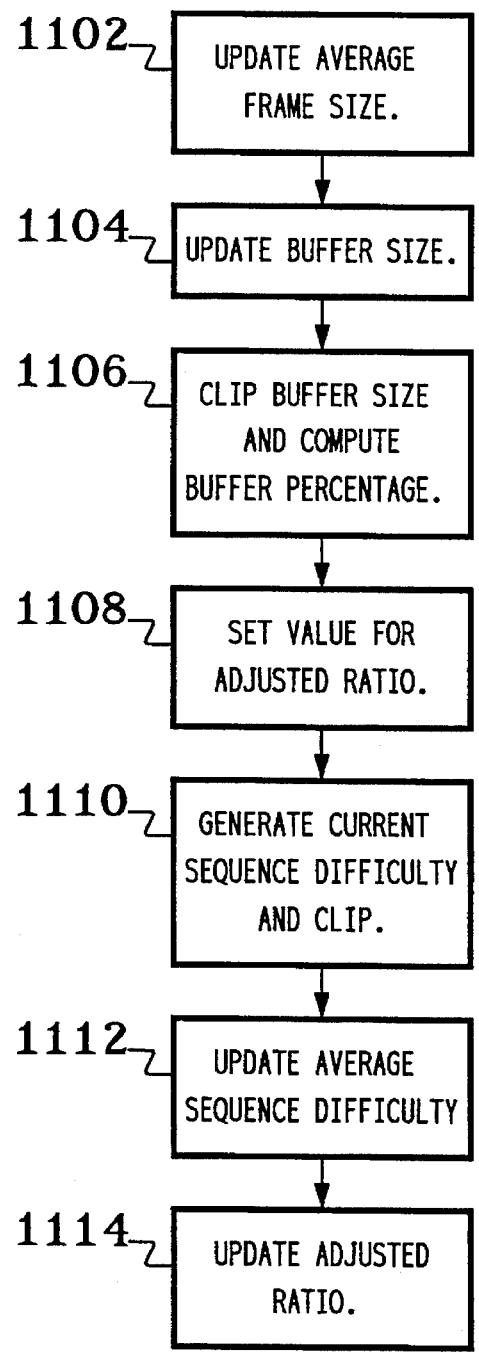

Referring now to FIGS. 10 and 11, there are shown the first and second parts, respectively, of the bit rate controller implemented by NRT encoder 110 to control compressed frame bit rates, according to a preferred embodiment of the present invention. NRT encoder 110 implements the first part of the bit rate controller at the start of processing for a new video frame using parameters updated when NRT encoder 110 processed the previous video frame. NRT encoder 110 implements the second part of the bit rate controller to update those parameters for use in processing the next video frame.

Within a scene in video, variation in the amount of motion may cause problems in maintaining a target bit rate. This may cause changes in the ratios of compressed key frames to compressed delta frames, which must be accounted for in order to keep video system 100 under control. The bit rate controller adjusts the compression level for the current video frame based upon the number of bits allocated for the previous frame and the patterns of number of bits unique to a compression technique having multiple types of frames (e.g., key frames, predicted delta frames, and disposable delta frames).

The bit rate controller of NRT encoder 110 preferably uses two matrices of ratios of frame types—one that describes the behavior of the compression technique in sections of video that are well predicted by motion compensation and one that describes the behavior in sections of video that are poorly predicted by motion compensation. These matrices are used both to determine how well predicted the motion compensation frames are and to change the quantization level based upon the differences between predicted compressed sizes and actual compressed sizes. This technique compensates for changes in the properties of the input video without relying on information about the current frame.

The bit rate controller of NRT encoder 110 maintains a model of a playback buffer corresponding to the video data being encoded. In the first part of the bit rate controller (block 902 of FIG. 9), if the buffer is more than half full (block 1002 of FIG. 10), then the bit rate controller updates the current ratio of compression C based on the buffer percentage BP (block 1004) using the following equation:

$$C=C*[1+(BP*2-1)^4], \quad (3)$$

where the buffer percentage BP is the percentage of the buffer filled. The higher the compression ratio C, the greater the compression of the current frame.

Whether or not the buffer is more than half full, the bit rate controller then updates the compression ratio C for differences between the calculated average frame size AFS and the specified target frame size TFS for the current type of frame (i.e., key, disposable, or predicted) (block 1006) using the following equation:

$$C = C * \left(1+kma*\left[\left(\frac{AFS}{TFS}\right)^{kpa}-1\right]\right) \quad (4)$$

where kmd and kpd are specified constants (preferably 0.20 and 1.25, respectively).

The bit rate controller then updates the compression ratio C based on the adjusted ratio b (block 1008) using the following equation:

$$C=C*(1+kmd*[(b)^{kpd}-1]) \quad (5)$$

where kmd and kpd are specified constants (preferably 0.20 and 1.25, respectively).

The bit rate controller then clips the compression ratio C to be within the range 1 to 127 (block 1010). This compression ratio C is used by NRT encoder 110 in encoding the current frame whether the current frame is a key frame (block 908 of FIG. 9), a disposable frame (block 912), or a predicted frame (block 914).

After the current frame has been encoded, NRT encoder 110 implements the second part of the bit rate controller (block 916 of FIG. 9). NRT encoder 110 updates the average frame size AFS based on the compressed frame size CFS of the current frame (block 1102 of FIG. 11) using the following equation:

$$AFS=kea*CFS+(1-kea)*AFS, \quad (6)$$

where kea is a specified constant (preferably 0.20).

NRT encoder 110 then updates the current buffer size BS (i.e., the size of the used portion of the buffer) (block 1104) using the following equation:

$$BS=BS+CFS-TFS, \quad (7)$$

where CFS is the calculated compressed frame size and TFS is the specified target frame size for the current type of frame (i.e., key, disposable, or predicted).

NRT encoder 110 then clips the current buffer size BS to be within the specified range (preferably 86,400 bytes) and computes the buffer percentage BP (i.e., the percentage of the buffer filled) (block 1106).

NRT encoder 110 then assigns a value to the adjusted ratio b (block 1108) using the following equation:

$$b = \frac{CFS}{TFS}, \quad (8)$$

where CFS is the compressed frame size and TFS is the target frame size.

NRT encoder 110 then uses the adjusted ratio b to interpolate a value for the current sequence difficulty CSD, which is then clipped to be within the range 0 to 1 (block 1110). The interpolation is based upon values stored in two matrices E and H. Matrix E contains values corresponding to the compression of "easy" video frames (i.e., video frames for which motion compensation does a relatively good job of predicting the current frame). Matrix H contains values corresponding to the compression of "hard" video frames (i.e., video frames for which motion compensation does a relatively poor job of predicting the current frame). When motion compensation does a good job, the amount of compressed video data is relatively small compared to the amount of compressed video data for video frames in which motion compensation does a poor job.

A set of preferred values for matrix E is given as follows:

$$E = \begin{array}{c|ccc} & K\_c & D\_c & P\_c \\ K\_p & 1.00 & 0.18 & 0.35 \\ D\_p & 3.63 & 1.00 & 1.97 \\ P\_p & 2.83 & 0.78 & 1.00 \end{array}$$

Similarly, a set of preferred values for matrix H is given as follows:

$$H = \begin{array}{c|ccc} & K\_c & D\_c & P\_c \\ K\_p & 1.00 & 0.51 & 0.66 \\ D\_p & 1.84 & 1.00 & 1.32 \\ P\_p & 1.50 & 0.82 & 1.00 \end{array}$$

where K_p, D_p, or P_p is the matrix row used when the previous frame was a key, disposable, or predicted frame, respectively, and K_c, D_c, or P_c is the matrix column used when the current frame is a key, disposable, or predicted frame, respectively.

For example, if the previous frame was a key frame (K_p) and the current frame is a disposable frame (D_c), then the interpolation value from matrix E is 0.18 and the interpolation value from matrix H is 0.51. If the adjusted ratio b has a value of 0.30, then the current sequence difficulty CSD is determined using the following equation:

$$CSD = \frac{b-E}{H-E} = \frac{0.30 - 0.18}{0.51 - 0.18} = 0.36 \quad (9)$$

The current sequence difficulty CSD is then clipped to be within the range 0 to 1. The current sequence difficulty CSD is preferably only generated when the current frame is of a type different from the previous frame. As such, H–E will not be 0 in the denominator of the previous equation.

After NRT encoder 110 generates the current sequence difficulty CSD (block 1110), NRT encoder 110 then updates the average sequence difficulty ASD using the current sequence difficulty CSD (block 1112) using the following equation:

$$ASD = ked * CSD + (1 - ked) * ASD, \quad (10)$$

where ked is a specified constant (preferably 0.40). The average sequence difficulty ASD corresponds to the difficulty of encoding the current image relative to the range from easy (matrix E) to hard (matrix H) where 0 corresponds to easy and 1 corresponds to hard. NRT encoder 110 then updates the adjusted ratio b based on the average sequence difficulty ASD (block 1114) using the following equation:

$$b = \frac{b}{E + (H-E) * ASD}, \quad (11)$$

where E and H are the appropriate entries from matrix E and matrix H, respectively. NRT encoder 110 retains the values for average frame size AFS, buffer percentage BP, adjusted ratio b, and average sequence difficulty ASD for use by the bit rate controller to process the next video frame.

The values for matrices E and H listed above were derived empirically using the following procedure. The first step is to select reasonable starting values for all the adjustable parameters. These starting values may be selected from a cursory look at the behavior of the algorithm. A variety of video clips are then compressed using the compression scheme. This variety should include clips with all possible combinations of levels for the following properties:

Scene length: long (>8 seconds), medium, and short (<2 seconds);

Noise: excessive and minimal; and

Motion: small/linear (easy), large/non-linear (hard), and a mixture of easy and hard.

The following steps are then performed at least once. First, with long clips, run compressions to tune the E and H matrices. Compress both noisy clips with hard motion and clean clips with easy motion, ignoring the resulting bit rate in both cases. Observe the (third) change in compression level that is dependent on the frame types and look for trends. For example, if the compression level consistently increases for easy clips of disposable frames following key frames, then the corresponding entry in matrix E should be increased. This procedure is repeated until there are no noticeable trends in the behavior of this adjustment to the compression level. When performance is improves, increase the variety of combinations of noise and motion.

Second, with shorter clips, pay attention to the bit rate controller's reaction to scene changes. Begin by adjusting the kind, kpd, and ked parameters. Use ked to adjust how slow reacting the system is to scene changes, use kmd to adjust how much the system should react, and use kpd to adjust the system's reaction curve. The goal of this step is to minimize the oscillations of changes in compression level caused by scene changes.

Third and last, by this point, the control should be smooth, but attention has not been paid to the bit rate controller's ability to match target data rate. Begin to adjust kma, kpa, and kea to make sure that the target bit rate is met. Use kea to adjust the system's responsiveness, use kma to adjust how much the system reacts when it does react, and use kpa to adjust the reaction curve. For this step, all types of video clips should be used.

Figure 20:
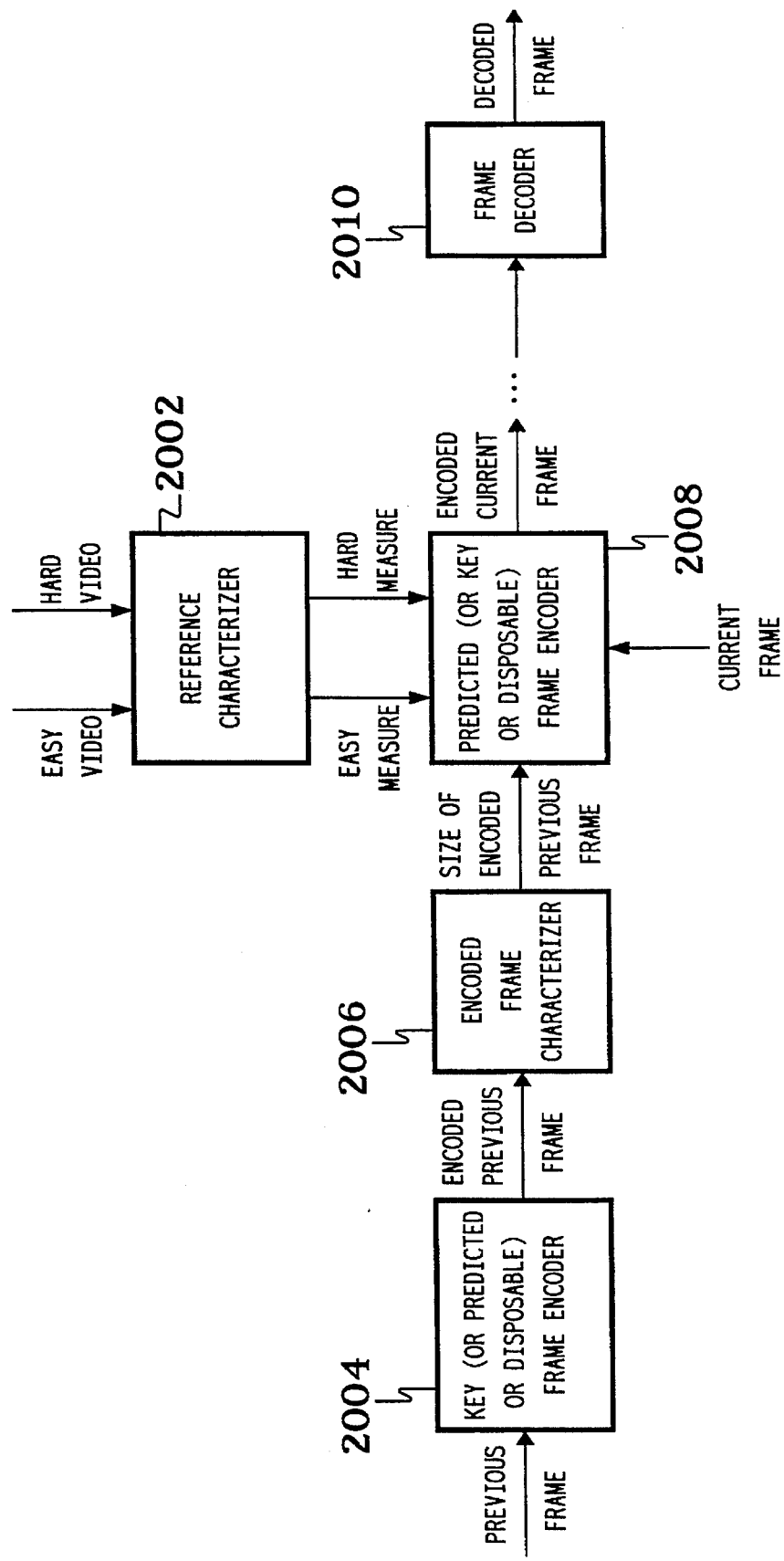
FIG. 20 is a block diagram of a system for encoding and decoding video signals according to the claimed invention.

Referring now to FIG. 20, there is shown a block diagram of a system for encoding and decoding video signals, according to the claimed invention. Reference characterizer 2002 is preferably an off-line processor that characterizes samples of easy video and hard video to generate easy and hard measures, respectively. Frame encoder 2008 encodes the current frame based on the easy and hard measures and on the size of the encoded previous frame. The previous frame is encoded by frame encoder 2004, and the size of the resulting encoded previous frame is then generated by encoded frame characterizer 2006. The previous frame may be either a key frame, a predicted frame, or a disposable frame. Likewise, the current frame may be either a key, predicted, or disposable frame, where the current frame and the previous frame are of different types. When the current frame and previous frame are of the same type, FIG. 20 does not apply. Frame decoder 2010 decodes the encoded frames generated by frame encoder 2080.

Delta Frame Encoding

Figure 12:
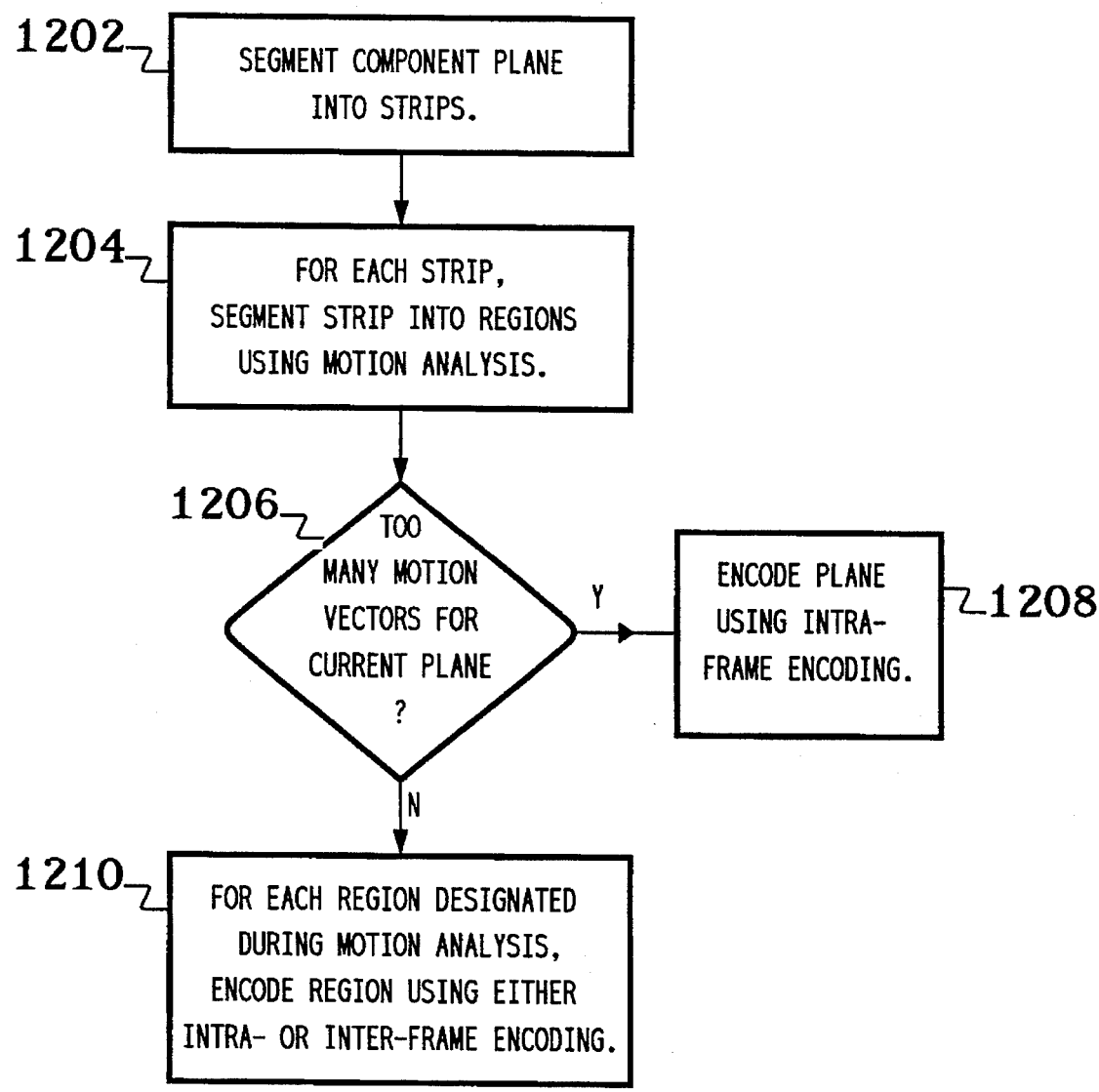
FIG. 12 is a process flow diagram of the processing implemented by the non-real-time encoder of the video system of FIG. 1 to encode each component plane of a delta frame.

Referring now to FIG. 12, there is shown a process flow diagram of the processing implemented by NRT encoder 110 to encode each component plane (i.e., Y, U, and V) of a delta frame (i.e., either a disposable frame or a predicted frame) into the syntax of video bitstream 200, according to a preferred embodiment of the present invention.

NRT encoder 110 begins to encode a component plane by segmenting the component plane (preferably vertically) into two or more strips (block 1202 of FIG. 12). In a preferred embodiment, there is sufficient memory to process each component plane of a frame at one time. In an alternative preferred embodiment, however, where memory may be limited, each component plane is divided into two or more strips, where each strip may be processed separately.

for each strip of the current component plane, NRT encoder 110 implements motion analysis to segment the strip into regions (block 1204). During motion analysis, NRT encoder 110 determines whether each region is to be encoded using inter-frame encoding or intra-frame encoding, and designates the region accordingly. For each region to be encoded using inter-frame encoding, NRT encoder 110 also determines a motion vector to be used to encode the region with respect to the reference frame. The segmentation processing of motion analysis is described in greater detail later in this specification in conjunction with FIG. 14.

In a preferred embodiment, there is a maximum number (preferably 256) of different motion vectors that may be used to encode the regions of a component plane. If the motion analysis of block 1204 results in too many motion vectors (block 1206), then the entire current component plane is encoded using intra-frame encoding (block 1208). Otherwise, each region of the component plane is encoded as designated during motion analysis (i.e., either using inter-frame encoding or intra-frame encoding) (block 1210). Inter-frame encoding is described in greater detail later in this specification in conjunction with FIG. 13. Intra-frame encoding is described in greater detail later in this specification in conjunction with FIG. 19.

Inter-Frame Encoding

Figure 13:
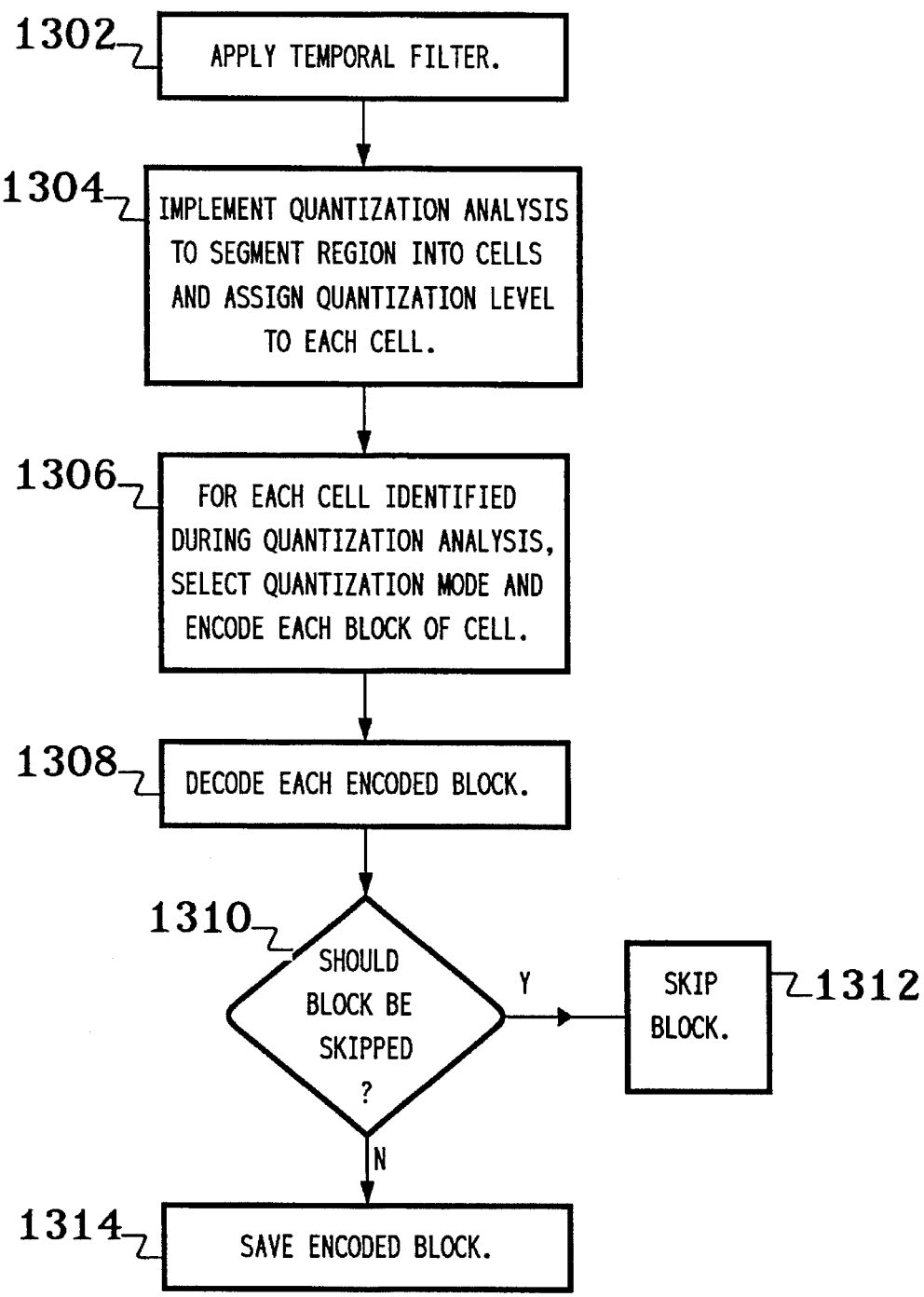
FIG. 13 is a process flow diagram of the processing implemented by the non-real-time encoder of the video system of FIG. 1 to encode a region of a component plane of a delta frame using inter-frame encoding.

Referring now to FIG. 13, there is shown a process flow diagram of the processing implemented by NRT encoder 110 to encode a region of a component plane of a delta frame using inter-frame encoding, according to a preferred embodiment of the present invention.

NRT encoder 110 begins inter-frame encoding by performing temporal filtering on region to be encoded (block 1302 of FIG. 13). Those skilled in the art will understand that the quality of a decoded image depends on the perturbation of the decoded image from the original image. In a preferred embodiment, NRT encoder 100 performs the following temporal filtering, the extent of which depends on the original image:

$D = Q - P$
$sign\_D = +1, \text{if}(D >= 0)$
$\quad\quad\quad = -1, \text{if}(D < 0)$
$D = abs(D)$
$D = D - Q/K$
$D = 0, \text{if}(D < 0)$
$D = sign\_D * D$
$Q = P + D$ where Q is the value of the pixel component of the current frame, P is the value of the corresponding predictor component of the reference frame (i.e., the motion compensated component value from the reference frame), and K is a specified filtering coefficient. The value of filtering coefficient K may be determined empirically. For predicted (i.e., non-disposable) delta frames, filtering coefficient K is preferably between 20 and 32 and is preferably about 26. For disposable delta frames, filtering coefficient K is preferably between 18 and 30 and is preferably about 24.

Those skilled in the art will understand that, since Q is brought closer to P, correlation is increased and the new difference D between Q and P is reduced in magnitude. Further, the amount by which the difference D is reduced depends on the original component value and there is therefore a direct correlation between extent of filtering and quality. In vector quantization, the number of bits required for coding increases with the magnitude of the differences being encoded. Since the preferred temporal filtering scheme brings differences D closer to zero, fewer bits are required to encoded the data.

Those skilled in the art will also understand that the temporal filtering scheme of the present invention may be implemented in systems other than video system 10. These other systems may encode frames using methods other than vector quantization (e.g., using transform-based coding such as DCT and wavelet encoding). It will also be understood that the temporal filtering scheme of the present invention may be implemented with or without motion compensation being implemented.

After temporal filtering, NRT encoder 110 implements quantization analysis to segment each region identified during motion analysis into cells and to assign a quantization level to each cell (block 134). The segmentation processing of quantization analysis is described in greater detail later in this specification in conjunction with FIG. 15.

For each cell identified during quantization analysis, NRT encoder 11selects a quantization mode for the cell and encodes each block of the cell using the selected quantization mode (block 136). In a preferred embodiment, a block is defined as a (4×4) sub-region of a component plane.

The selection of quantization mode for inter-frame encoding a cell is based on the similarity of the pixels in the cell to each other. NRT encoder 110 generates a horizontal similarity measure $S_h$ and a vertical similarity measure $S_v$ for the cell, according to the following equations:

$$S_h = \frac{1}{(N-1)M} \sum_{i=0}^{N-2} \sum_{j=0}^{M-1} [f(i+1,j) - f(i,j)]^2 \quad (12)$$

and $$S_v = \frac{1}{N(M-2)} \sum_{i=0}^{N-1} \sum_{j=0}^{M-2} [f(i,j+1) - f(i,j)]^2 \quad (13)$$

where f(i,j) is the motion compensated difference value corresponding to row i and column j of the cell. N and M are the vertical and horizontal dimensions of the cell, respectively.

If horizontal similarity measure $S_h$ is greater than a specified threshold $T_3$ and if vertical similarity measure $S_v$ is greater than a specified threshold $T_4$ and if cell height N and width M are both integer multiples of 8, then mode 10 is selected for encoding blocks of the current cell. Otherwise, if vertical similarity measure $S_v$ is greater than threshold L and if cell height N is an integer multiples of 8, then mode 11 is selected. Otherwise, mode 0 is selected. Modes 10, 11, and 0 are described in greater detail earlier in this specification in conjunction with Table I.

The values of thresholds $T_3$ and $T_4$ depend upon the type of frame (i.e., key, predicted, or disposable), the output buffer status, and the desired picture quality. In a preferred embodiment, $T_3$ and $T_4$ are determined using the following equation:

$$T_3 = T_4 = A(e^{-\frac{Q^2}{B}} - e^{-\frac{1}{B}}) \quad (14)$$

where:

$$B = \frac{0.25}{\log \frac{A}{C}} \quad (15)$$

where Q is a target quality measure that is either specified or automatically adjusted by the bit-rate controller of NRT encoder 110. Target quality measure Q preferably serves as an indicator of the buffer status. Constants A and C are external parameters that control the shape of the quality curve. Constant A represents the threshold value when a minimum quality is desired, while constant C represents the threshold value at an average quality. Constant A is preferably not equal to constant C. In a preferred embodiment, constants A and C have values of approximately 100 and 25, respectively.

Those skilled in the art will understand that, in alternative preferred embodiments, similarity measures $S_h$ and $S_v$ may be derived using functions different from those described above (e.g., functions based on absolute value of differences rather than squares of differences).

After selecting the quantization mode for the cell, NRT encoder 110 encodes each (4×4) block of the cell using inter-frame encoding according to the selected quantization modes. Those skilled in the art will understand that inter-frame encoding is based on inter-frame pixel differences, where the pixel differences are calculated by subtracting the motion compensated component values of the reference frame from the component values of the current frame.

In video bitstream 200, each (4×4) block may be represented as encoded data or designated as a skip block. A skip block designation tells a decoder of video bitstream 200 that the component values for the (4×4) block are the same component values for the corresponding block of the reconstructed previous frame (i.e., the previous frame to be displayed). NRT encoder 110 determines whether each block is a skip block. In a preferred embodiment, skip blocks are used to encode regions of only disposable delta frames. In alternative preferred embodiment, skip blocks may also be used to encode regions of predicted delta frames and/or key frames.

In general, a block of the current frame is skipped if the block is similar enough to the corresponding decoded block of the previous frame. To determine whether to skip a block, NRT encoder 110 decodes the encoded block of the current frame (block 1308) and compares the resulting reconstructed block to the corresponding decoded block of the previous frame (i.e., the block to be displayed for the previous frame) (block 1310). For YUV9 data, NRT encoder 110 generates three partial error measures SAE using the following equations:

$$SAE_y = \sum_{i=0}^{N-1} \sum_{j=0}^{M-1} |y_r(i,j) - y_d(i,j)| \quad (16)$$

$$SAE_v = \sum_{i=0}^{\frac{N}{4}-1} \sum_{j=0}^{\frac{M}{4}-1} |v_r(i,j) - v_d(i,j)| \quad (17)$$

$$SAE_u = \sum_{i=0}^{\frac{N}{4}-1} \sum_{j=0}^{\frac{M}{4}-1} |u_r(i,j) - u_d(i,j)| \quad (18)$$

where $SAE_y$, $SAE_v$, and $SAE_u$ are the partial error measures between the reconstructed block for the current frame and the displayed block for the previous frame for the Y, V, and U components, respectively. N and M are the vertical and horizontal Y-component block dimensions (i.e., each preferably 4). $y_r(i,j)$, $v_r(i,j)$, and $u_r(i,j)$ are the reconstructed values for the Y, V, and U components of the current frame, respectively. $y_d(i,j)$, $v_d(i,j)$, and $U_d(i,j)$ are the display values for the Y, V, and U components of the previous frame, respectively. If:

$$(SAE_y + A*SAE_v + B*SAE_u) < T, \quad (19)$$

then NRT encoder 110 skips the current block; otherwise, the current block is not skipped. A and B are specified constants (preferably equal to 4). The threshold value T is determined according to the following equation:

$$T = C*Q, \quad (20)$$

where Q is the quantization level and C is a constant. The value of constant C may be selected empirically and preferably has a value of approximately 24.

Those skilled in the art will understand that, in alternative preferred embodiments, the three partial error measures SAE may be derived using functions different from those described above (e.g., functions based on squares of differences rather than absolute value of differences).

If the block is to be skipped (block 1310), then NRT encoder 110 skips the block (block 1312) by designating the block as a skip block in video bitstream 200 and discarding the encoded data. Otherwise, NRT encoder 110 saves the encoded data for the block in video bitstream 200 (block 1314). Those skilled in the art will understand that NRT encoder 110 also generates the decoded reference frames used for processing subsequent frames. The data stored in the reference frames is dictated in part by the determination of whether each block is a skip block. If it is a skip block, then the reconstructed prediction error is discarded and only the prediction is written to the reference frame.

Segmentation Using Motion Analysis

Figure 14:
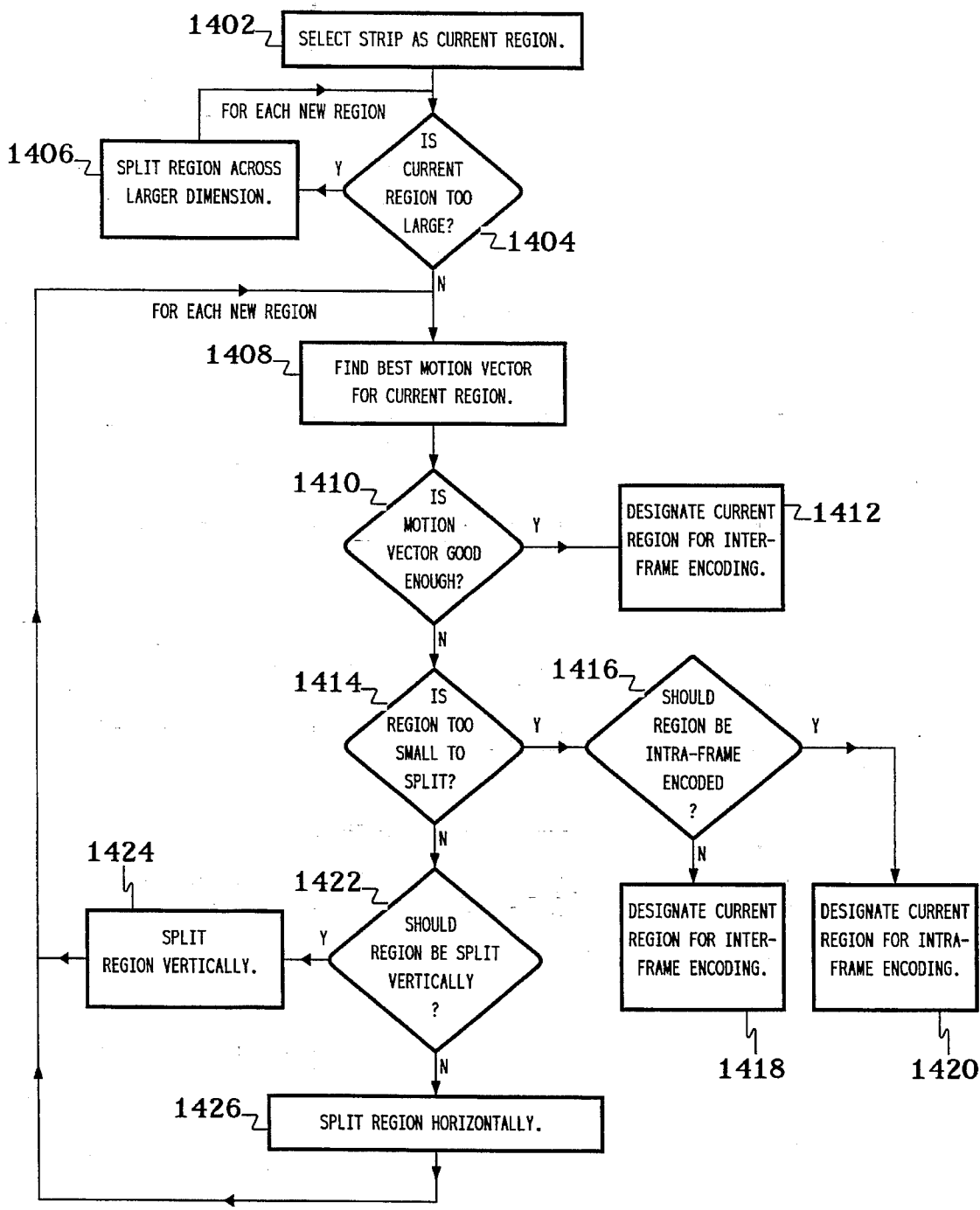
FIG. 14 is a process flow diagram of the processing implemented by the non-real-time encoder of the video system of FIG. 1 to segment a strip of a component plane of the current frame into regions using motion analysis.

Referring now to FIG. 14, there is shown a process flow diagram of the processing implemented by NRT encoder 110 to segment a strip of a component plane of the current frame into regions using motion analysis, according to a preferred embodiment of the present invention.

NRT encoder 110 starts motion analysis by selecting the entire strip as the current region (block 142 of FIG. 14). In a preferred embodiment, there is a specified range of sizes of regions for which NRT encoder 110 performs motion estimation and compensation, where the size of a region is based on the number of pixels within the region. Regions that are bigger than the specified maximum region size are split until they are within the range. Regions that are smaller than the specified minimum region size are not split any further.

In splitting a region during motion analysis, the region is preferably divided into two new regions where at least one of the new regions has dimensions that are integer multiples of 8. Thus, if a region having 24 columns is divided vertically, the two new regions preferably have 16 and 8 columns, respectively. The same preference for integer multiples of 8 applies to the splitting of cells during quantization analysis.

Thus, if the current region is larger than the specified maximum region size (block 1404), then the region is split across its larger dimension (block 1406). That is, if the vertical dimension of the current region is greater than the horizontal dimension, then the current region is split horizontally; otherwise, the current region is split vertically.

Those skilled in the art will understand that splitting across the larger dimension is performed to avoid long, thin regions. After the splitting of block 1406, processing returns to block 1404 independently with each of the new regions selected as the current region.

If the current region is not too large, then NRT encoder 110 finds the best motion vector for the current region (block 1408) using standard motion estimation techniques. If the selected motion vector is good enough (block 1410), then NRT encoder 110 designates the current region for inter-frame encoding and motion analysis for the current region is terminated (block 1412). NRT encoder 110 determines whether the selected motion vector is good enough by characterizing how well the motion compensated data (i.e., the motion compensated data from the reference frame) matches the current region. This characterization is preferably based on determining the mean square difference between the two sets of data. If the mean square difference is less than a specified threshold (having an empirically determined value), then the motion vector is good enough.

If the motion vector is not good enough, then NRT encoder 110 determines whether the current region is too small to be split further (block 1414). If the current region is too small to split, then NRT encoder 110 determines whether the current region should be inter-frame encoded or intra-frame encoded (block 1416).

Those skilled in the art will understand a region may be predicted in two ways: by the average region value or by reference to a previous reference frame. The variance of the pixel values of the region is a measure of the uniformity of the region and therefore a measure of how well the region can be predicted based on the average region value. The mean square prediction error (i.e., the sum of the squares of the pixel differences between the region and the reference image) is a measure of the uniformity between the region and the reference frame and therefore a measure of how well the region can be predicted in reference to the reference frame.

NRT encoder 110 determines whether the current region is to be encoded using inter-frame encoding or intra-frame encoding by comparing the variance of the region to the mean square prediction error for the region. If the variance is smaller than the mean square prediction error, then NRT encoder 110 designates the current region for intra-frame encoding (block 1420). Otherwise, NRT encoder 110 designates the current region for inter-frame encoding (block 1418). In either case, motion analysis for the current region is terminated.

If the current region is not too small to be split (block 1414), then NRT encoder 110 determines whether to split the current region vertically or horizontally (block 1422). To determine how to split the current region, NRT encoder 110 divides the current region into four quadrants and determines the mean square error $E_i$ for each quadrant using the motion vector selected in block 1408. NRT encoder 110 then determines a horizontal factor HF and a vertical factor VF according to the following equations:

$$HF = |E_0 - E_1| + |E_2 - E_3| \qquad (21)$$

and $$VF = |E_0 - E_2| + |E_1 - E_3| \qquad (22)$$

where $E_0$ is the mean square error for the upper left quadrant, $E_1$ is the mean square error for the upper right quadrant, $E_2$ is the mean square error for the lower left quadrant, and $E_3$ is the mean square error for the lower right quadrant. If horizontal factor HF is less than vertical factor VF, then the current region is split horizontally (block 1424); otherwise, the current region is split vertically (block 1426). In either case, after splitting the current region, processing returns to block 1408 independently with each of the new regions selected as the current region.

Those skilled in the art will understand that other algorithms exist for segmenting component planes into regions using motion analysis. For example, the plane may be divided into minimum sized regions (e.g., (8×8) or (4×4) regions) and the best motion vector may be found for each minimum sized regions. The plane may then be segmented into regions from top down by testing the sets of motion vectors associated with each region. If the set of motion vectors for a given region are fairly uniform, then motion analysis for that region may be terminated. Otherwise, the region may be split either vertically or horizontally depending upon the corresponding subsets of motion vectors and the geometry of the region (e.g., is region getting too skinny?). Processing continues until each region either (1) is too small to be split further or (2) contains a uniform set of motion vectors.

Segmentation Using Quantization Analysis

Figure 15:
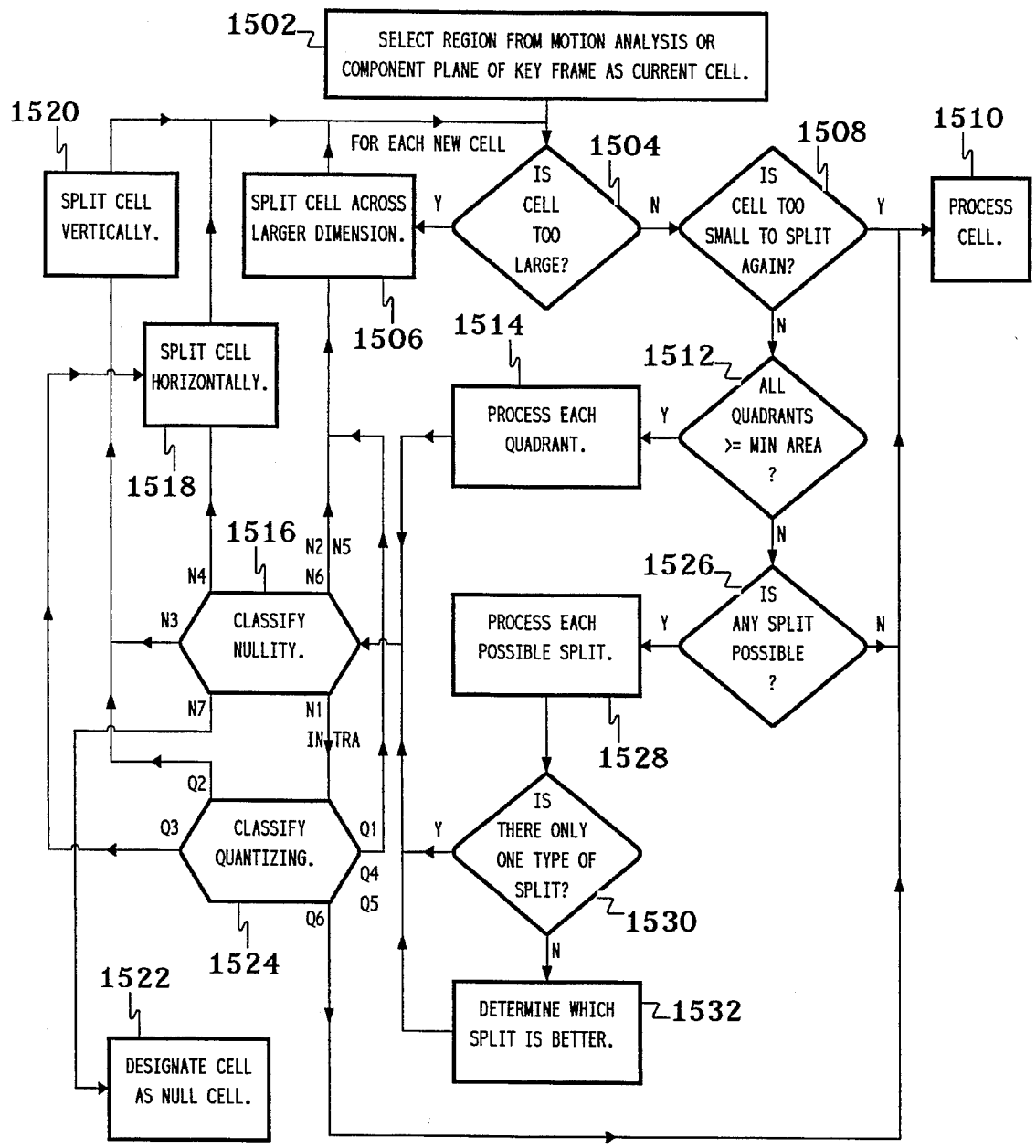
FIG. 15 is a process flow diagram of the processing implemented by the non-real-time encoder of the video system of FIG. 1 to segment a region of a component plane of the current frame into cells using quantization analysis.

Referring now to FIG. 15, there is shown a process flow diagram of the processing implemented by NRT encoder 110 to segment a region of a component plane of the current frame into cells using quantization analysis, according to a preferred embodiment of the present invention. The region segmented by NRT encoder 110 may be a region (to be either inter-frame encoded or intra-frame encoded) identified during motion analysis as described earlier in this specification in conjunction with FIG. 14. Depending upon the selection of values for certain control parameters, quantization analysis may split a region into cells based upon the size of the region, the contents (i.e., the component values) of the region, or both. The quantization analysis of FIG. 15 is also used to segment the strips of component planes of key frames to be intra-frame encoded.

Quantization analysis segments regions into cells with preference towards (1) detection of null cells (i.e., cells that have insignificant differences from the motion compensated predicted images, (2) detection of uniform cells, and (3) generation of cells that are more square in shape. The identification of beneficial quantization splits (e.g., by efficient detection of null cells and uniform cells) tends to reduce the bit rate of the video bitstream 200. Trying to keep cells more square tends to improve image quality by reducing quantization artifacts caused by quantization levels in rectangle that are much larger in one dimension than the other dimension.

For delta frames, NRT encoder 11begins quantization analysis by selecting the current region identified during motion analysis as the current cell (block 1502). For key frames, NRT encoder 110 begins quantization analysis by selecting the current strip of the current component plane as the current cell (block 1502). In either case, if the current cell is too large (i.e., the current cell has more pixels than a specified maximum number of pixels) (block 1504), then NRT encoder 11splits the cell across the larger dimension (block 1506). After the splitting of block 1506, processing returns to block 1504 independently with each of the new cell selected as the current cell.

If the current cell is not too large (block 1504), then NRT encoder 110 determines whether the current cell is too small to be split further (i.e., the current cell has fewer pixels than a specified minimum number of pixels). If the current cell is too small to be split further (block 1508), then NRT encoder 110 generates the appropriate pixel differences for the cell, determines a quantization level for the cell, and determines which (4×4) blocks of the cell may be encoded as null blocks (block 1510).

When the current cell is to be encoded using inter-frame encoding, the appropriate pixel differences are the differences between the component values in the cell and the corresponding component values (taking into account any motion compensation) from the reference frame. When the current cell is to be encoded using intra-frame encoding, the appropriate pixel differences are preferably the differences between vertically adjacent component values within the current cell. In a preferred embodiment, only blocks of a cell to be encoded using inter-frame encoding may be encoded as null blocks. Null blocks may be used, however, with intra-frame encoding in alternative preferred embodiments. After the processing of block 1510, quantization analysis for the current cell is complete.

If the current cell can be split again (block 1508), NRT encoder 110 determines whether, if the cell were split into four quadrants, each quadrant would be larger than the minimum area threshold (i.e., the minimum number of pixels for cell splitting). If all four quadrants are larger than the minimum area (block 1512), then NRT encoder 110 generates the appropriate pixel differences for each quadrant, determines a quantization level for each quadrant, and determines which (4×4) blocks of each quadrant may be encoded as null blocks (block 1514). The processing of block 1514 for quadrants is similar to the processing of block 1510 for cells, as described earlier.

If the current cell is to be encoded using inter-frame encoding, then NRT encoder 110 classifies the nullity of the four quadrants of the current cell to determine how, if at all, the current cell should be split (block 1516). Otherwise, the current cell is to be encoded using intra-frame encoding and NRT encoder 110 skips the processing of block 1516, since null blocks are preferably not allowed with intra-frame encoding.

Figure 16:
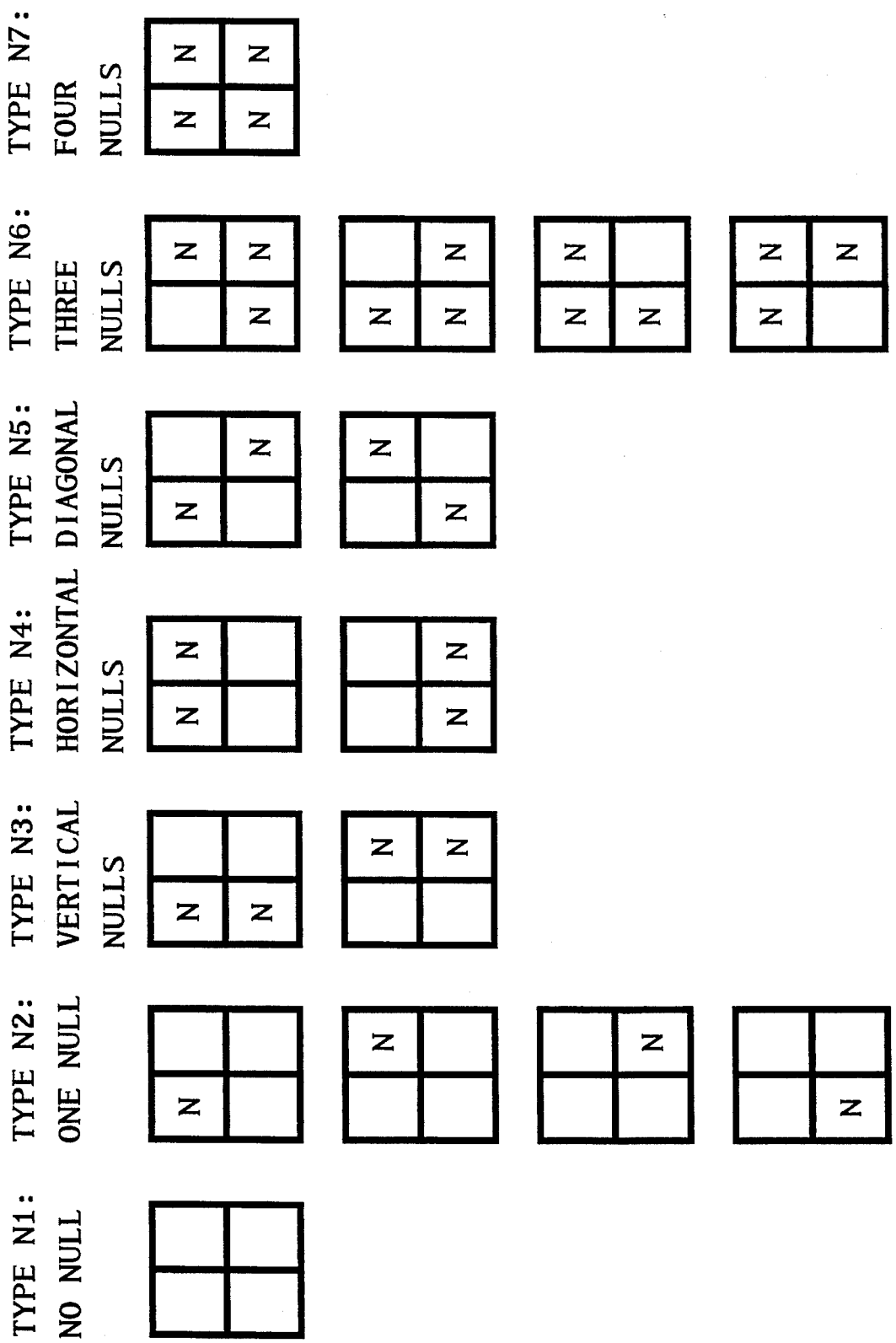
FIG. 16 shows the seven different types of quadrant nullity that may exist in a cell.

Referring now to FIG. 16, there are shown the seven different types of quadrant nullity that may exist in a cell. A quadrant is said to be a null quadrant if every (4×4) block of the quadrant can be encoded as a null block. Those skilled in the art will understand that, if all four quadrants are null quadrants, then the entire cell is preferably encoded as a null cell. It will also be understood that, if two adjacent quadrants are both null quadrants, then the cell is preferably split into two new cells where the two null quadrants are in the same new cell so that that new cell may be encoded as a null cell.

Thus, if all of the quadrants are null quadrants (type N7 in FIG. 16), then NRT encoder 110 designates the current cell as a null cell and quantization analysis is complete for the current cell (block 1522). Otherwise, if there are two vertical null quadrants (type N3), then NRT encoder 110 splits the current cell vertically (block 1520). Similarly, if there are two horizontal null quadrants (type N4), then NRT. encoder 110 splits the current cell horizontally (block 1518).

If only one of the quadrants is a null quadrant (type N2) or if there are two diagonal null quadrants (type N5) or if exactly three of the quadrants are null quadrants (type N6), then the cell is split across its larger dimension (block 1506). After the splitting according to either blocks 1520, 1518, or 1506, processing returns to block 1504 independently with each of the new cells selected as the current cell. In an alternative preferred embodiment, if only one of the quadrants is a null quadrant (type N2), then processing continues to block 1524.

If none of the quadrants are null quadrants (type N1) or if the current cell is to be encoded using intra-frame encoding, then NRT encoder 110 classifies the quantization levels of the four quadrants of the current cell to determine how, if at all, the current cell should be split (block 1524).

Referring now to FIG. 17, there are shown the six different types of quadrant quantizing that may exist in a cell. Two or more quadrants are said to match if they have the same quantization level. Those skilled in the art will understand that, if all four quadrants have the same quantization level, then the entire cell is preferably encoded using that quantization level. It will also be understood that, if two adjacent quadrants have the same quantization level, then the cell is preferably split into two new cells where the two quadrants having the same quantization level are in the same new cell so that that new cell may be encoded using the same quantization level.

Thus, if all of the quadrants have the same quantization level (type Q6 in FIG. 17), then NRT encoder 110 generates the appropriate pixel differences for the cell, determines a quantization level for the cell, and determines which (4×4) blocks of the cell may be encoded as null blocks (block 1510). After the processing of block 1510, quantization analysis for the current cell is complete.

Otherwise, if only vertical quadrants have the same quantization level (type Q2), then NRT encoder 110 splits the current cell vertically (block 1520). Similarly, if only horizontal quadrants have the same quantization level (type Q3), then NRT encoder 110 splits the current cell horizontally (block 1518).

If all four quadrants have different quantization levels (type Q1) or if exactly three of the quadrants have the same quantization level (type Q5) or if only diagonal quadrants have the same quantization level (type Q4), then the cell is split across its larger dimension (block 1506). After the splitting according to either blocks 1520, 1518, or 1506, processing returns to block 1504 independently with each of the new cell selected as the current cell.

If all of the four quadrants are not larger than the minimum area (block 1512), then NRT encoder 110 determines whether any split (either a vertical or a horizontal split) is possible. A vertical split is possible, if, after splitting the cell vertically, the two new cells are both greater than the minimum cell size. Similarly, a horizontal split is possible, if, after splitting the cell horizontally, the two new cells are both greater than the minimum cell size. If neither a vertical nor a horizontal split is possible (block 1526), then NRT encoder 110 generates the appropriate pixel differences for the cell, determines a quantization level for the cell, and determines which (4×4) blocks of the cell may be encoded as null blocks (block 1510). After the processing of block 1510, quantization analysis for the current cell is complete.

If a split is possible (block 1526), then NRT encoder 110 generates the appropriate pixel differences for each possible new cell, determines a quantization level for each possible new cell, and determines which (4×4) blocks of each possible new cell may be encoded as null blocks (block 1528). If only a vertical split is possible, then the possible new cells are only the left and right halves of the current cell. If only a horizontal split is possible, then the possible new cells are only the top and bottom halves of the current cell. If both a vertical split and a horizontal split are possible, then the possible new cells are the left, right, top, and bottom halves of the current cell.

If only one type of split is possible (i.e., either a vertical split or a horizontal split, but not both) (block 1530), then NRT encoder 110 classifies the nullity of the current cell (block 1516) and if necessary the quantizing of the current cell (block 1524). In this case, the cell is characterized in terms of the two halves. Thus, for example, when only a vertical split is possible, the nullity of the cell can only be of type N1, type N3, or type N7 of FIG. 16 and the quantizing of the cell can only of type Q2 or type Q6 of FIG. 17.

If both a horizontal split or a vertical split are possible (block 1530), then NRT encoder 110 determines which split is better (block 1532). The processing implemented by NRT encoder 110 to determine which split is better is described in greater detail later in this specification in conjunction with FIG. 18. After deciding whether to split horizontally or vertically (block 1532), NRT encoder 110 classifies the nullity of the current cell (block 1516) and if necessary the quantizing of the current cell (block 1524) in terms of the selected halves as described earlier.

Figure 18:
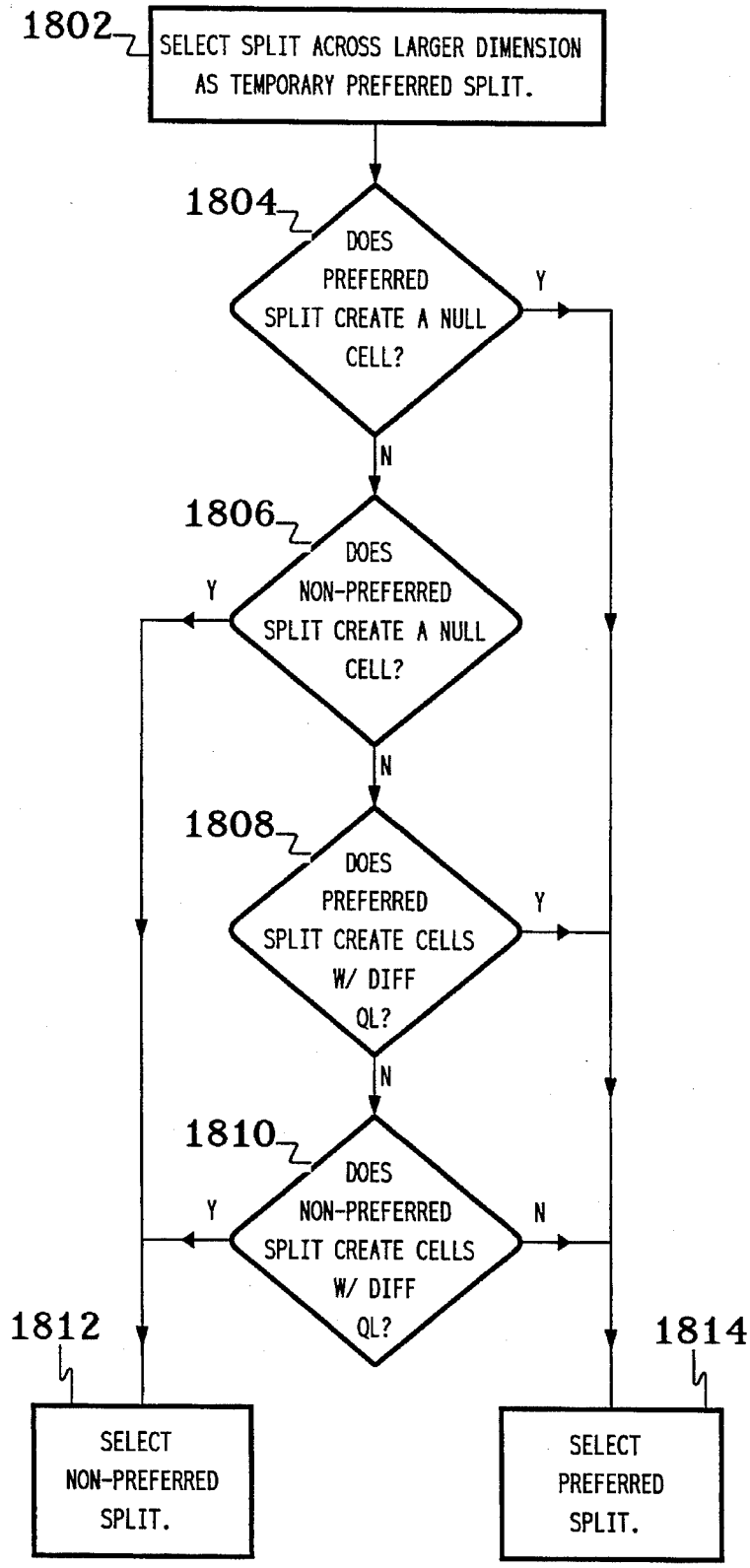
FIG. 18 is a process flow diagram of the processing implemented by the non-real-time encoder of the video system of FIG. 1 to determine whether to split a cell vertically or horizontally during quantization analysis when either split is possible, but the four quadrants of the cell are not all larger than the minimum cell size.

Referring now to FIG. 18, there is shown a process flow diagram of the processing implemented by NRT encoder 11to determine whether to split a cell vertically or horizontally during quantization analysis when either split is possible, but the four quadrants of the cell are not all larger than the minimum cell size, according to a preferred embodiment of the present invention. In deciding whether to split such a cell vertically or horizontally, the temporary preference is to split across the larger dimension (block 1802 of FIG. 18).

If the preferred split creates a null cell (i.e., if one or both of the resulting new cells would be a null cell) (block 1804), then the preferred split is selected (block 1814). Otherwise, if the non-preferred split creates a null cell (block 1806), then the non-preferred split is selected (block 1812). Otherwise, if the preferred split creates two new cells having different quantization levels (block 1808), then the preferred split is selected (block 1814). Otherwise, if the non-preferred split creates two new cells having different quantization levels (block 1810), then the non-preferred split is selected (block 1812). Otherwise, the preferred split is selected (block 1814).

Those skilled in the art will understand that the maximum and minimum cell size thresholds may be selected such that NRT encoder 1implements only blocks 1502, 1504, 1506, 1508, and 1510 of FIG. 14. For example, if the maximum cell size threshold and the minimum cell size threshold are both selected to be 256, then processing of FIG. 14 will never reach block 1512.

Those skilled in the art will understand that the preferred embodiment of quantization analysis described above in conjunction with FIGS. 15–18 is a top-down approach to segmentation. Alternative preferred embodiments of quantization analysis may involve a bottom-up approach. In this bottom-up approach, a region of a component plane (or even the entire component plane) is divided into cells of a selected minimum size (e.g., 8×8). Each minimum-sized cell is then analyzed to determine whether it may be encoded as a null cell and, if not, to determine a quantization level for the cell. A binary tree structure is then generated based on the results of that analysis.

Key Frame Encoding

Figure 19:
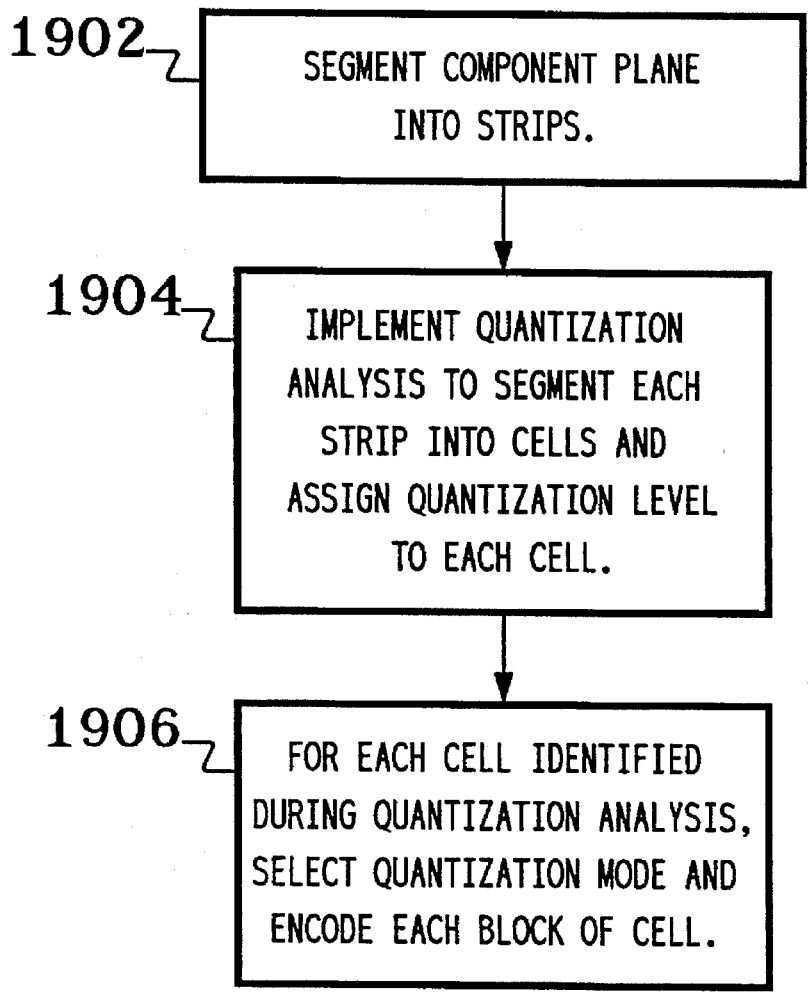
FIG. 19 is a process flow diagram of the processing implemented by the non-real-time encoder of the video system of FIG. 1 to encode each component plane of a key frame.

Referring now to FIG. 19, there is shown a process flow diagram of the processing implemented by NRT encoder 110 to encode each component plane of a key frame into the syntax of video bitstream 200, according to a preferred embodiment of the present invention. Since a key frame is encoded without reference to any previous frames, motion analysis is not used to segment key frames.

NRT encoder 110 begins key frame encoding of a component plane by segmenting the component plane into strips (block 1902 of FIG. 19). NRT encoder 110 then implements quantization analysis to segment each strip of the component plane into cells and to assign a quantization level to each cell (block 1904). The segmentation processing of quantization analysis for key frame encoding is the substantially identical to that implemented for delta frame encoding, as described in greater detail earlier in this specification in conjunction with FIG. 15.

For each cell identified during quantization analysis, NRT encoder 110 selects a quantization mode for the cell and encodes each block of the cell using the selected quantization mode (block 1906). The selection of quantization mode for intra-frame encoding a cell is similar to that implemented for inter-frame encoding, as described earlier in this specification in conjunction with FIG. 19. NRT encoder 110 generates a horizontal similarity measure $S_h$ and a vertical similarity measure $S_v$ for the cell, according to the following equations:

$$S_h = \frac{1}{(N-1)M} \sum_{i=0}^{N-2} \sum_{j=0}^{M-1} [f(i+1,j) - f(i,j)]^2 \quad (23)$$

and $$S_v = \frac{1}{N(M-1)} \sum_{i=0}^{N-1} \sum_{j=0}^{M-2} [f(i,j+1) - f(i,j)]^2 \quad (24)$$

where f(i,j) is the original component value corresponding to row i and column j of the cell. N and M are the vertical and horizontal dimensions of the cell, respectively.

If horizontal similarity measure $S_h$ is greater than a specified threshold $T_1$ and if vertical similarity measure $S_v$ is greater than a specified threshold $T_2$ and if cell height N and width M are both integer multiples of 8, then mode 10 is selected for encoding blocks of the current cell. Otherwise, if vertical similarity measure $S_v$ is greater than threshold $T_2$ and if cell height N s an integer multiples of 8, then mode 3 is selected. Otherwise, mode 0 is selected. Modes 10, 3, and 0 are described in greater detail earlier in this specification in conjunction with Table I.

The values of thresholds $T_1$ and $T_2$ depend upon the type of frame (i.e., key, predicted, or disposable), the output buffer status, and the desired picture quality. In a preferred embodiment, $T_1$ and $T_2$ are determined using the same equation used to determine $T_3$ and $T_4$ for inter-frame encoding, as described earlier in this specification.

Those skilled in the art will understand that, in alternative preferred embodiments, similarity measures $S_h$ and $S_v$ may be derived using functions different from those described above (e.g., functions based on absolute value of differences rather than squares of differences).

Filtering for Applying Low-Resolution Modes

Some of the quantization modes listed in Table I preferably involve sub-sampling before quantization. As a result, filtering is desirable to avoid aliasing. For example, in mode 3, the columns of the original component plane are filtered vertically by applying a (1,2,1) filter. A (1,3) filter is applied on the edges.

In mode 10, if the frame is a key frame, then a (1,2,1) filter is first applied to the columns of the original component plane. Then a (1,1) filter is applied to the rows of the corresponding difference plane (which results from predicting each row in the plane from the previous row). In mode 10, if the frame is a delta frame, then a (1,1) filter is applied to the rows and columns of the prediction error plane.

Similarly, in mode 11, a (1,1) filter is applied to the columns of the prediction error plane.

Tests for Forcing Null Cells and Monotone Blocks

In order to save bits, it is desirable for NRT encoder 110 to encode as null cells those cells that would naturally quantize to zeros. However, forcing null cells may result in reduced quality of the encoded image sequence at the desired bit-rate. In a preferred mode, the bit-rate controller determines null cells without actually quantizing the cells.

First, the image is divided into (8×8) regions and a quantization level is determined for each region. Then, each pixel value of the region is compared to the quantization step size to determine if the region can be forced to null. Finally, all adjacent zero regions are merged into larger cells. Similarly, all adjacent regions with the same quantization level are merged into larger cells. The binary tree of video bitstream 200 is used to describe the null cells and the quantization levels of the non-null cells. Therefore, the binary tree description is preferably considered while merging cells.

The following test is preferably used to enforce the null cells with all quantization modes in key frames and predicted frames. A region is forced to zero, if for every component value $x_i$ in the region of the original frame:

$$(|x_i - y_i| < c_1 * q) \text{ or } (|x_i - y_i| < c_2 * x_i) \quad (25)$$

where $Y_i$ is the corresponding component value in the predicted frame, q is the quantization level step size for the region, and $c_1$ and $c_2$ are positive constants. The second part of the above test is used to ignore those pixels that can be visually tolerated. In a preferred embodiment, constants $c_1$ and $c_2$ have different values depending upon whether the current frame is a key frame or a delta frame. Constants $c_1$ and $c_2$ may be controlled by external parameters.

A similar test is preferably used to enforce (4×4) monotone blocks in modes 0, 1, 2, 3, 7, 8, and 9 of Table I. Where p is the mean of an original (4×4) block, the block is forced to a monotone value $\mu$, if for every component value $x_i$ in the region of the original frame:

$$(|x_i - \mu| < c_3 * q) \text{ or } (|x_i - \mu| < c_4 * x_i) \quad (26)$$

where constants $c_3$ and $c_4$, are preferably positive constants that may be controlled by an external parameter.

Those skilled in the art will understand that alternative embodiments of the present invention may be based on multi-media operating systems other than Microsoft® Video for Windows and Apple® QuickTime and/or in PC environments based on processors other than Intel® ×86 or Motorola® microprocessors. It will also be understood by those skilled in the art that the present invention may be used to convert data corresponding to images other than video images.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for encoding video signals, comprising the steps of:
   (a) providing a reference characterization of encoded frame encoded using a first encoding process relative to encoded frames encoded using a second encoding process for a variety of frame;
   (b) encoding a previous frame using the first encoding process;
   (c) characterizing the encoded previous frame; and
   (d) encoding a current frame using the second encoding process, wherein the current frame is encoded in accordance with the reference characterization of step (a) and the characterization of the encoded previous frame of step (c), wherein:
   the reference characterization comprises an easy measure and a hard measure, wherein:
      the easy measure corresponds to the size of a first encoded frame relative to the size of a second encoded frame, wherein:
         the first encoded frame is a first frame encoded using the first encoding process;
         the second encoded frame is a second frame encoded using the second encoding process; and
         the first frame and the second frame are frames of a first video sequence for which motion compensation provides an accurate prediction; and
      the hard measure corresponds to the size of a third encoded frame relative to the size of a fourth encoded frame, wherein:
         the third encoded frame is a third frame encoded using the first encoding process;
         the fourth encoded frame is a fourth frame encoded using the second encoding process; and
         the third frame and the fourth frame are frames of a second video sequence for which motion compensation provides an inaccurate prediction, wherein the accurate prediction is more accurate than the inaccurate prediction;
   step (c) comprises the step of characterizing the size of the encoded previous frame; and
   step (d) comprises the step of encoding the current frame based on the size of the encoded previous frame relative to the easy measure and the hard measure.

2. The process of claim 1, wherein:
   the first encoding process encodes one of key frames, predicted frames, and disposable frames; and
   the second encoding process encodes one of key frames, predicted frames, and disposable frames, wherein the first encoding process is different from the second encoding process.

3. The process of claim 1, wherein:
   step (c) comprises the steps of:
      (1) updating an average frame size AFS using the encoded previous frame size CFS;
      (2) updating a current size BS using the encoded previous frame size CFS and a target frame size TFS for the previous frame;
      (3) clipping the buffer size BS to be within specified buffer-size limits;
      (4) generating a buffer percentage BP using the buffer size BS;
      (5) generating an adjusted ratio b using the encoded previous frame size CFS and the target frame size TFS;
      (6) generating a sequence difficulty CSD using the adjusted ratio b, the easy measure E, and the hard measure H;
      (7) clipping the sequence difficulty CSD to be between specified sequence-difficulty limits;
      (8) updating an average sequence difficulty ASD using the sequence difficulty CSD; and
      (9) updating the adjusted ratio b using the average sequence difficulty ASD, the easy measure E, and the hard measure H; and
   step (d) comprises the steps of:
      (1) updating a compression parameter C using the buffer percentage BP, if the buffer percentage BP indicates that a playback buffer model is half full;

(2) updating the compression parameter C using the average frame size AFS of step (c)(1) and the target frame size TFS;

(3) updating the compression parameter C using adjusted ratio b of step (c)(5);

(4) clipping the compression parameter C to be within specified compression-parameter limits; and (5) encoding the current frame in accordance with the compression parameter C.

4. The process of claim 3, wherein:

step (c)(1) comprises the step of implementing:

$$AFS=kea*CFS+(1-kea)*AFS,$$

wherein kea is a specified constant;

step (c)(2) comprises the step of implementing:

$$BS=BS+CFS-TFS;$$

step (c)(5) comprises the step of implementing:

$$b = \frac{CFS}{TFS};$$

step (c)(6) comprises the step of implementing:

$$CSD = \frac{b-E}{H-E};$$

step (c)(8) comprises the step of implementing:

$$ASD=ked*CSD+(1-ked)*ASD;$$

step (c)(9) comprises the step of implementing:

$$b = \frac{b}{E+(H-E)*ASD};$$

step (d)(1) comprises the step of implementing:

$$C=C*[1+(BP*2-1)^4];$$

step (d)(2) comprises the step of implementing:

$$C = C * \left( 1 + kma * \left[ \left( \frac{AFS}{TFS} \right)^{kpa} - 1 \right] \right),$$

wherein kma and kpa are specified constants; and step (d)(3) comprises the step of implementing:

$$C=C*(1+kmd*[(b)^{kpd}-1]),$$

wherein kmd and dpd are specified constants.

5. The process of claim 1, wherein step (a) comprises the step of generating the reference characterization empirically using a variety of video sequences.

6. An apparatus for encoding video signals, comprising:

(a) means for providing a reference characterization of encoded frames encoded using a first encoding process relative to encoded frames encoded using a second encoding process for a variety of frames;

(b) means for encoding a previous frame using the first encoding process;

(c) means for characterizing the encoded previous frame; and (d) means for encoding a current frame using the second encoding process, wherein the current frame is encoded in accordance with the reference characterization of means (a) and the characterization of the encoded previous frame of means (c), wherein:

the reference characterization comprises an easy measure and a hard measure, wherein:

the easy measure corresponds to the size of a first encoded frame relative to the size of a second encoded frame, wherein:

the first encoded frame is a first frame encoded using the first encoding process;

the second encoded frame is a second frame encoded using the second encoding process; and the first frame and the second frame are frames of a first video sequence for which motion compensation provides an accurate prediction; and the hard measure corresponds to the size of a third encoded frame relative to the size of a fourth encoded frame, wherein:

the third encoded frame is a third frame encoded using the first encoding process;

the fourth encoded frame is a fourth frame encoded using the second encoding process; and the third frame and the fourth frame are frames of a second video sequence for which motion compensation provides an inaccurate prediction, wherein the accurate prediction is more accurate than the inaccurate prediction;

step (c) comprises means for characterizing the size of the encoded previous frame; and step (d) comprises means for encoding the current frame based on the size of the encoded previous frame relative to the easy measure and the hard measure.

7. The apparatus of claim 6, wherein:

the first encoding process encodes one of key frames, predicted frames, and disposable frames; and the second encoding process encodes one of key frames, predicted frames, and disposable frames, wherein the first encoding process is different from the second encoding process.

8. The apparatus of claim 6, wherein:

means (c) comprises:

(1) means for updating an average frame size AFS using the encoded previous frame size CFS;

(2) means for updating a current size BS using the encoded previous frame size CFS and a target frame size TFS for the previous frame;

(3) means for clipping the buffer size BS to be within specified buffer-size limits;

(4) means for generating a buffer percentage BP using the buffer size BS;

(5) means for generating an adjusted ratio b using the encoded previous frame size CFS and the target frame size TFS;

(6) means for generating a sequence difficulty CSD using the adjusted ratio b, the easy measure E, and the hard measure H;

(7) means for clipping the sequence difficulty CSD to be between specified sequence-difficulty limits;

(8) means for updating an average sequence difficulty ASD using the sequence difficulty CSD; and (9) means for updating the adjusted ratio b using the average sequence difficulty ASD, the easy measure E, and the hard measure H; and means (d) comprises:

(1) means for updating a compression parameter C using the buffer percentage BP, if the buffer percentage BP indicates that a playback buffer model is half full;

(2) means for updating the compression parameter C using the average frame size AFS of means (c)(1) and the target frame size TFS;
(3) means for updating the compression parameter C using adjusted ratio b of means (c)(5);
(4) means for clipping the compression parameter C to be within specified compression-parameter limits; and
(5) means for encoding the current frame in accordance with the compression parameter C.

9. The apparatus of claim 8, wherein:

means (c)(1) comprises means for implementing:

$$AFS = kea*CFS + (1-kea)*AFS,$$

wherein kea is a specified constant;

means (c)(2) comprises means for implementing:

$$BS = BS + CFS - TFS;$$

means (c)(5) comprises means for implementing:

$$b = \frac{CFS}{TFS};$$

means (c)(6) comprises means for implementing:

$$CSD = \frac{b - E}{H - E};$$

means (c)(8) comprises means for implementing:

$$ASD = ked*CSD + (1-ked)*ASD;$$

means (c)(9) comprises means for implementing:

$$b = \frac{b}{E + (H - E) * ASD};$$

means (d)(1) comprises means for implementing:

$$C = C*[1 + (BP*2 - 1)^4];$$

means (d)(2) comprises means for implementing:

$$C = C * \left( 1 + kma * \left[ \left( \frac{AFS}{TFS} \right)^{kpa} - 1 \right] \right),$$

wherein kma and kpa are specified constants; and means (d)(3) comprises means for implementing:

$$C = C*(1 + kmd*[(b)^{kpd} - 1]),$$

wherein kmd and dpd are specified constants.

10. The apparatus of claim 6, wherein means (a) comprises means for generating the reference characterization empirically using a variety of video sequences.

11. The apparatus of claim 6, wherein the apparatus comprises a processor, the processor is electrically connected to a bus, the bus is electrically connected to a memory device, and the processor comprises means (b), (c), and (d).

12. A computer-implemented process for decoding encoded video signals, comprising the steps of:

(1) providing the encoded video signals; and
(2) decoding the encoded video signals to generate decoded video signals, wherein the encoded video signals were encoded by:
(a) providing a reference characterization of encoded frames encoded using a first encoding process relative to encoded frames encoded using a second encoding process for a variety of frames;
(b) encoding a previous frame using the first encoding process;
(c) characterizing the encoded previous frame; and
(d) encoding a current frame using the second encoding process, wherein the current frame is encoded in accordance with the reference characterization of step (a) and the characterization of the encoded previous frame of step (c), wherein:

the reference characterization comprises an easy measure and a hard measure, wherein:
the easy measure corresponds to the size of a first encoded frame relative to the size of a second encoded frame, wherein:
the first encoded frame is a first frame encoded using the first encoding process;
the second encoded frame is a second frame encoded using the second encoding process; and
the first frame and the second frame are frames of a first video sequence for which motion compensation provides an accurate prediction; and
the hard measure corresponds to the size of a third encoded frame relative to the size of a fourth encoded frame, wherein:
the third encoded frame is a third frame encoded using the first encoding process;
the fourth encoded frame is a fourth frame encoded using the second encoding process; and
the third frame and the fourth frame are frames of a second video sequence for which motion compensation provides an inaccurate prediction, wherein the accurate prediction is more accurate than the inaccurate prediction;

step (c) comprises the step of characterizing the size of the encoded previous frame; and step (d) comprises the step of encoding the current frame based on the size of the encoded previous frame relative to the easy measure and the hard measure.

13. The process of claim 12, wherein:

the first encoding process encodes one of key frames, predicted frames, and disposable frames; and
the second encoding process encodes one of key frames, predicted frames, and disposable frames, wherein the first encoding process is different from the second encoding process.

14. The process of claim 12, wherein:

step (c) comprises the steps of:
(1) updating an average frame size AFS using the encoded previous frame size CFS;
(2) updating a current size BS using the encoded previous frame size CFS and a target frame size TFS for the previous frame;
(3) clipping the buffer size BS to be within specified buffer-size limits;
(4) generating a buffer percentage BP using the buffer size BS;
(5) generating an adjusted ratio b using the encoded previous frame size CFS and the target frame size TFS;
(6) generating a sequence difficulty CSD using the adjusted ratio b, the easy measure E, and the hard measure H;
(7) clipping the sequence difficulty CSD to be between specified sequence-difficulty limits;
(8) updating an average sequence difficulty ASD using the sequence difficulty CSD; and (9) updating the adjusted ratio b using the average sequence difficulty ASD, the easy measure E, and the hard measure H; and step (d) comprises the steps of:
(1) updating a compression parameter C using the buffer percentage BP, if the buffer percentage BP indicates that a playback buffer model is half full;
(2) updating the compression parameter C using the average frame size AFS of step (c)(1) and the target frame size TFS;
(3) updating the compression parameter C using adjusted ratio b of step (c)(5);
(4) clipping the compression parameter C to be within specified compression-parameter limits; and
(5) encoding the-current frame in accordance with the compression parameter C.

15. The process of claim 14, wherein:

step (c)(1) comprises the step of implementing:

$AFS=kea*CFS+(1-kea)*AFS,$ wherein kea is a specified constant;
step (c)(2) comprises the step of implementing:

$BS=BS+CFS-TFS;$ step (c)(5) comprises the step of implementing:

$b = \frac{CFS}{TFS};$ step (c)(6) comprises the step of implementing:

$CSD = \frac{b-E}{H-E};$ step (c)(8) comprises the step of implementing:

$ASD=ked*CSD+(1-ked)*ASD;$ step (c)(9) comprises the step of implementing:

$b = \frac{b}{E+(H-E)*ASD};$ step (d)(1) comprises the step of implementing:

$C=C*[1+(BP*2-1)^4];$ step (d)(2) comprises the step of implementing:

$C = C * \left( 1 + kma * \left[ \left( \frac{AFS}{TFS} \right)^{kpa} - 1 \right] \right),$ wherein kma and kpa are specified constants; and
step (d)(3) comprises the step of implementing:

$C=C*(1+kmd*[(b)^{kpd}-1]),$ wherein kmd and dpd are specified constants.

16. The process of claim 12, wherein step (a) comprises the step of generating the reference characterization empirically using a variety of video sequences.

17. An apparatus for decoding encoded video signals, comprising:
(1) means for providing the encoded video signals; and
(2) means for decoding the encoded video signals to generate decoded video signals, wherein the encoded video signals were encoded by:

(a) providing a reference characterization of encoded frames encoded using a first encoding process relative to encoded frames encoded using a second encoding process for a variety of frames;
(b) encoding a previous frame using the first encoding process;
(c) characterizing the encoded previous frame; and
(d) encoding a current frame using the second encoding process, wherein the current frame is encoded in accordance with the reference characterization of step (a) and the characterization of the encoded previous frame of step (c), wherein:

the reference characterization comprises an easy measure and a hard measure, wherein:
the easy measure corresponds to the size of a first encoded frame relative to the size of a second encoded frame, wherein:
the first encoded frame is a first frame encoded using the first encoding process;
the second encoded frame is a second frame encoded using the second encoding process; and
the first frame and the second frame are frames of a first video sequence for which motion compensation provides an accurate prediction; and
the hard measure corresponds to the size of a third encoded frame relative to the size of a fourth encoded frame, wherein:
the third encoded frame is a third frame encoded using the first encoding process;
the fourth encoded frame is a fourth frame encoded using the second encoding process; and
the third frame and the fourth frame are frames of a second video sequence for which motion compensation provides an inaccurate prediction, wherein the accurate prediction is more accurate than the inaccurate prediction;

step (c) comprises the step of characterizing the size of the encoded previous frame; and
step (d) comprises the step of encoding the current frame based on the size of the encoded previous frame relative to the easy measure and the hard measure.

18. The apparatus of claim 17, wherein:
the first encoding process encodes one of key frames, predicted frames, and disposable frames; and
the second encoding process encodes one of key frames, predicted frames, and disposable frames, wherein the first encoding process is different from the second encoding process.

19. The apparatus of claim 17, wherein:
step (c) comprises the steps of:
(1) updating an average frame size AFS using the encoded previous frame size CFS;
(2) updating a current size BS using the encoded previous frame size CFS and a target frame size TFS for the previous frame;
(3) clipping the buffer size BS to be within specified buffer-size limits;
(4) generating a buffer percentage BP using the buffer size BS;
(5) generating an adjusted ratio b using the encoded previous frame size CFS and the target frame size TFS;
(6) generating a sequence difficulty CSD using the adjusted ratio b, the easy measure E, and the hard measure H;

(7) clipping the sequence difficulty CSD to be between specified sequence-difficulty limits;
(8) updating an average sequence difficulty ASD using the sequence difficulty CSD; and
(9) updating the adjusted ratio b using the average sequence difficulty ASD, the easy measure E, and the hard measure H; and step (d) comprises the steps of:
(1) updating a compression parameter C using the buffer percentage BP, if the buffer percentage BP indicates that a playback buffer model is half full;
(2) updating the compression parameter C using the average frame size AFS of step (c)(1) and the target frame size TFS;
(3) updating the compression parameter C using adjusted ratio b of step (c)(5);
(4) clipping the compression parameter C to be within specified compression-parameter limits; and
(5) encoding the current frame in accordance with the compression parameter C.

20. The apparatus of claim 19, wherein:
step (c)(1) comprises the step of implementing:

$$AFS=kea*CFS+(1-kea)*AFS,$$

wherein kea is a specified constant;
step (c)(2) comprises the step of implementing:

$$BS=BS+CFS-TFS;$$

step (c)(5) comprises the step of implementing:

$$b = \frac{CFS}{TFS} \ ;$$

step (c)(6) comprises the step of implementing:

$$CSD = \frac{b-E}{H-E} \ ;$$

step (c)(8) comprises the step of implementing:

$$ASD=ked*CSD+(1-ked)*ASD;$$

step (c)(9) comprises the step of implementing:

$$b = \frac{b}{E+(H-E)*ASD} \ ;$$

step (d)(1) comprises the step of implementing:

$$C=C*[1+(BP*2-1)^4];$$

step (d)(2) comprises the step of implementing:

$$C = C * \left( 1 + kma * \left[ \left( \frac{AFS}{TFS} \right)^{kpa} - 1 \right] \right),$$

wherein kma and kpa are specified constants; and
step (d)(3) comprises the step of implementing:

$$C=C*(1+kmd*[(b)^{kpd}-1]),$$

wherein kmd and dpd are specified constants.

21. The apparatus of claim 17, wherein step (a) comprises the step of generating the reference characterization empirically using a variety of video sequences.

22. The apparatus of claim 17, wherein the apparatus comprises a processor, the processor is electrically connected to a bus, the bus is electrically connected to a memory device, and the processor comprises means (2).

* * * * *